(12) United States Patent
Ke et al.

(10) Patent No.: US 12,530,397 B2
(45) Date of Patent: Jan. 20, 2026

(54) IMAGE-BASED SEARCH PROCESSING METHOD, ELECTRONIC DEVICE AND STORAGE MEDIUM

(71) Applicant: Beijing Baidu Netcom Science Technology Co., Ltd., Beijing (CN)

(72) Inventors: Jia Ke, Beijing (CN); Shifan Lai, Beijing (CN); Yuxian Chen, Beijing (CN); Xiaoqian Zheng, Beijing (CN); Peihan Yang, Beijing (CN); Siyue Lei, Beijing (CN); Zhenyang Li, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/886,839

(22) Filed: Sep. 16, 2024

(65) Prior Publication Data

US 2025/0371072 A1 Dec. 4, 2025

(30) Foreign Application Priority Data

May 30, 2024 (CN) .......................... 202410693976.5

(51) Int. Cl.
*G06F 16/50* (2019.01)
*G06F 16/532* (2019.01)
(Continued)

(52) U.S. Cl.
CPC .......... *G06F 16/535* (2019.01); *G06F 16/532* (2019.01); *G06F 16/538* (2019.01)

(58) Field of Classification Search
CPC ..... G06F 16/535; G06F 16/532; G06F 16/538
See application file for complete search history.

(56) References Cited

U.S. PATENT DOCUMENTS 8,204,897 B1 * 6/2012 Djabarov ............ G06F 16/9538
707/767
11,275,780 B2 * 3/2022 Tsuji ..................... G06F 16/583
(Continued)

FOREIGN PATENT DOCUMENTS

CN 114647756 6/2022
CN 116501960 7/2023
(Continued)

OTHER PUBLICATIONS

Article entitled "Comparative Study of Different Optical Character Recognition Models on Handwritten and Printed Medical Reports", by Kumar et al., dated 2023 (Year: 2023).*
(Continued)

*Primary Examiner* — Mahesh H Dwivedi
(74) *Attorney, Agent, or Firm* — Knobbe, Martens, Olson & Bear, LLP

(57) ABSTRACT

Provided is an image-based search processing method, an electronic device and a storage medium, relating to the technical fields of computer vision, deep learning, natural language processing, and searching. The method includes: determining, in response to receiving an image sent by a terminal, a first requirement corresponding to the image, the first requirement including an original search intent of a user; generating a search result and a recommended content corresponding to the image according to the first requirement in a case where the first requirement meets a recommendation triggering condition; and returning the search result and the recommended content to the terminal to cause the terminal to output the search result and the recommended content on a search result page.

16 Claims, 11 Drawing Sheets

(51) Int. Cl.
  *G06F 16/535*  (2019.01)
  *G06F 16/538*  (2019.01)

(56) References Cited

U.S. PATENT DOCUMENTS

| | | | | |
|---|---|---|---|---|
| 2011/0173217 | A1* | 7/2011 | Kasperski | G06F 16/3322 |
| | | | | 707/767 |
| 2014/0164406 | A1* | 6/2014 | Petrou | G06F 16/532 |
| | | | | 707/769 |
| 2017/0300495 | A1* | 10/2017 | Sharifi | G06F 16/90335 |
| 2018/0108066 | A1* | 4/2018 | Kale | G06F 16/24522 |
| 2020/0019628 | A1 | 1/2020 | Chen et al. | |
| 2020/0242152 | A1* | 7/2020 | Huang | G06F 16/3329 |
| 2021/0064612 | A1 | 3/2021 | Huang et al. | |
| 2023/0009267 | A1* | 1/2023 | Dagan | G06F 16/24578 |
| 2024/0028638 | A1* | 1/2024 | Miklos | G06F 16/532 |
| 2024/0126808 | A1* | 4/2024 | Hao | G06V 10/74 |
| 2024/0378236 | A1 | 11/2024 | Kharbanda et al. | |
| 2024/0378237 | A1* | 11/2024 | Kharbanda | G06F 16/583 |

FOREIGN PATENT DOCUMENTS

| | | |
|---|---|---|
| JP | 2015-225657 | 12/2015 |
| JP | 2016-115294 | 6/2016 |
| JP | 2022-051559 | 3/2022 |
| JP | 2024-075869 | 6/2024 |
| JP | 2024-163063 | 11/2024 |

OTHER PUBLICATIONS

Extended European Search Report issued in EP Application No. 24201199.7, dated Feb. 4, 2025.
Office Action issued in Japanese Application No. 2024-194250, dated Aug. 26, 2025.

* cited by examiner

IMAGE-BASED SEARCH PROCESSING METHOD, ELECTRONIC DEVICE AND STORAGE MEDIUM

CROSS-REFERENCE TO RELATED APPLICATIONS

The present application claims the priority from Chinese Patent Application No. 202410693976.5, filed with the Chinese Patent Office on May 30, 2024, the content of which is hereby incorporated herein by reference in its entirety.

TECHNICAL FIELD

The present disclosure relates to the technical field of artificial intelligence, especially to the technical fields of computer vision, deep learning, natural language processing, and searching, and is applicable to scenarios such as image recognition, image searching, intelligent recommendation, and the like, and specifically to an image-based searching processing method and apparatus, device and storage medium.

BACKGROUND

In a traditional flow based on image search, after a user inputs an image, a search result is presented. However, when the search result does not meet the user's requirements, the user needs to additionally clarify and refine the requirements, or re-take a photo, which increases the complexity of the search and has a low search efficiency.

SUMMARY

The present disclosure provides an image-based search processing method and apparatus, a device and a storage medium.

According to a first aspect of the present disclosure, an image-based search processing method is provided. The method includes:
  determining, in response to receiving an image sent by a terminal, a first requirement corresponding to the image, the first requirement including an original search intent of a user;
  generating a search result and a recommended content corresponding to the image according to the first requirement in a case where the first requirement meets a recommendation triggering condition; and
  returning the search result and the recommended content to the terminal to cause the terminal to output the search result and the recommended content on a search result page.

According to a second aspect of the present disclosure, an image-based search processing method is provided. The method includes:
  sending, in response to receiving an image input by a user through a search application, the image to a server;
  receiving a search result and a recommended content returned by the server; where the search result is determined in a case where the image meets a recommendation triggering condition, and the search result is determined based on a first requirement corresponding to the image, the first requirement including an original search intent of the user; and
  displaying the search result and the recommended content on a search result page According to a third aspect of the present disclosure, an image-based search processing apparatus is provided. The apparatus includes:
  a first determining module, configured to determine, in response to receiving an image sent by a terminal, a first requirement corresponding to the image, the first requirement including an original search intent of a user;
  a generating module, configured to generate a search result and a recommended content corresponding to the image according to the first requirement in a case where the first requirement meets a recommendation triggering condition; and
  a first communication module, configured to return the search result and the recommended content to the terminal to cause the terminal to output the search result and the recommended content on a search result page.

According to a fourth aspect of the present disclosure, an image-based search processing apparatus is provided. The apparatus includes:
  a second communication module, configured to send, in response to receiving an image input by a user through a search application, the image to a server; and receive a search result and a recommended content returned by the server; where the search result is determined in a case where the image meets a recommendation triggering condition, and the search result is determined based on a first requirement corresponding to the image, the first requirement including an original search intent of the user; and
  an output control module, configured to display the search result and the recommended content on a search result page.

According to a fifth aspect of the present disclosure, an electronic device is provided. The electronic device includes:
  at least one processor; and
  a memory connected in communication with the at least one processor;
  where the memory stores an instruction executable by the at least one processor, and the instruction, when executed by the at least one processor, enables the at least one processor to execute the method of any embodiment of the present disclosure.

According to a sixth aspect of the present disclosure, a non-transitory computer-readable storage medium storing a computer instruction is provided. The computer instruction is used to cause a computer to execute the method of any embodiment of the present disclosure.

According to a seventh aspect of the present disclosure, a computer program product is provided. The computer program product includes a computer program which, when executed by a processor, implements the method of any embodiment of the present disclosure.

According to the solution of the present disclosure, when performing an image-based search, an approach of outputting a search result and a recommended content in the first round of reply is adopted. When the search result cannot meet the requirements of a user, the user can quickly clarify the search requirement through the recommended content without needing to re-photograph and upload an image and without needing to spend more time and energy to express the requirements, so that the search efficiency may be improved, and the intelligence and convenience of the search may be improved.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

The drawings are for a better understanding of the present solution and do not constitute a limitation of the present disclosure. In which.

DETAILED DESCRIPTION

Figure 1:
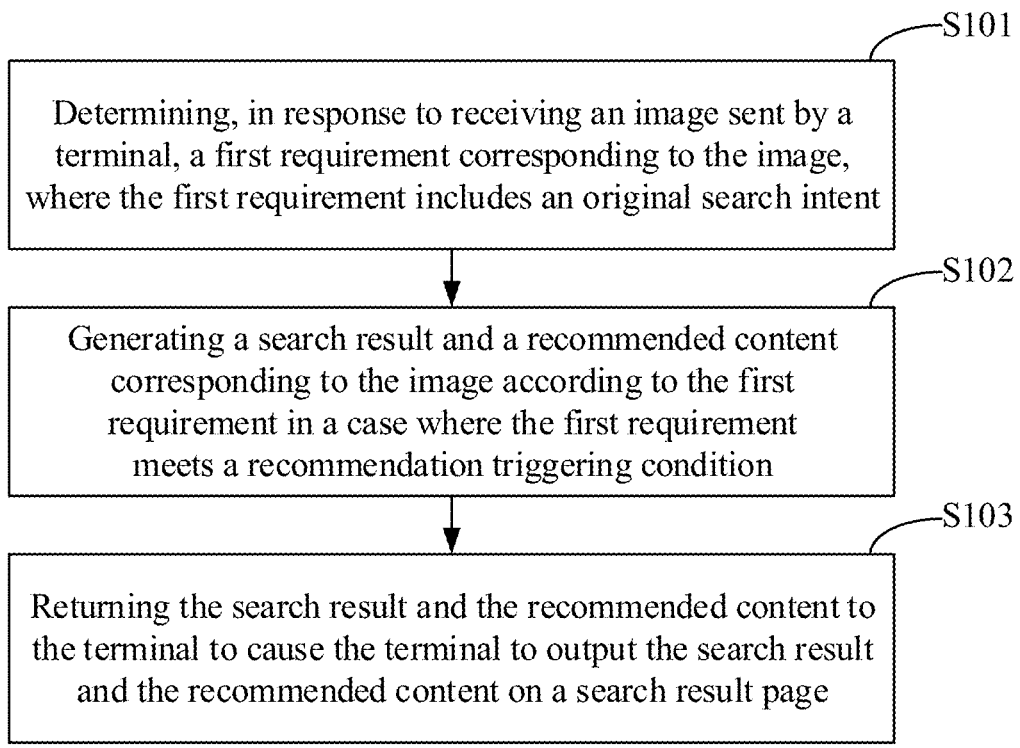
FIG. 1 is a schematic diagram of a flow of an image-based search processing method according to an embodiment of the present disclosure.

The exemplary embodiments of the present disclosure are described below in conjunction with the accompanying drawings, including various details of embodiments of the present disclosure to facilitate understanding, which should be considered as exemplary only. Therefore, it should be recognized by those having ordinary skill in the art that various changes and modifications may be made to the embodiments described herein without departing from the scope of the present disclosure. Similarly, for clarity and conciseness, the description of well-known functions and structures is omitted in the following description.

The terms "first", "second", "third" and the like in the specification and claims as well as in the above drawings of the present disclosure are used to distinguish between similar objects and not necessarily to describe a particular order or sequence. Furthermore, the terms "including" and "having", as well as any variations thereof, are intended to cover a non-exclusive inclusion, e.g., including a series of steps or units. The methods, systems, products, or devices are not necessarily limited to those steps or units expressly listed, but may include other steps or units not expressly listed or inherent to such processes, methods, products, or devices.

In the conventional image recognition product, based on the image recognition, image search (searching for a problem, searching for the same image, recognizing animals and plants/commodities, etc.), and image processing (real scene translation, scanning a document, etc.) technology, performing the image search by photographing or uploading an image from a photo album to meet the requirements. In this way, only the existing search results on the network can be pulled. Further, if the user continues to ask a follow-up question, he needs to go back to the text search box of the image recognition product for follow-up questioning. For example, when a user is driving and finds that the warning light on the dashboard is on, only the preliminary cognitive requirements can be met after the user photographs and performs the searching, and it is necessary to ask "how to solve the tire pressure indicator lamp" in the text search box to obtain a satisfactory answer. If the recognition result does not meet expectations, it is necessary to photograph again/upload the image from the photo album again for image recognition. Even if the photographing and image recognition product has derived an image-text search function, the user can add a text question to search after uploading the image, the satisfactory answers returned by this method is less, and it is difficult to answer the question raised by the user, and the user's potential requirements such as "what to do" and "what is the reason" cannot be met. If the user is not satisfied with the answer result, he can only re-upload and change the description of the question for search. The search operation path on the user side is complex and the desired result cannot be obtained, and the user's requirements are difficult to meet.

In Artificial Intelligence (AI) dialog products, which are primarily text-based dialogues rather than image-based searches. Although AI dialog products can understand and generate natural languages for deep multiple rounds of dialogues, they do not have the function of guiding, asking in return, or recommending. The dialog generation is based on the user's input and the preset rules of the model, and if the user's requirements or problems are not clear, although the user may be guided to provide more information by generating a problem or a prompt, this is not asking in return or a recommendation based on a search result and a search term (query). For example, the user uploads an image with multiple subjects and does not specify it in the query, which results in a poor model generation effect and does not conform to the user's intent. At this time, the user does not necessarily know the reason and is not prompted an optimization direction, and then it is difficult to obtain a satisfactory answer.

Therefore, the conventional image recognition product and the image recognition product such as the AI dialog product have at least the following problems in the search process:

1. Lack of Fine Guidance for Unclear Requirements:
   in the conventional image recognition product, after a user uploads an image with an unclear intent, the image recognition result does not necessarily meet the user's requirements, but the user can only initiate a search again to expect to obtain an ideal answer by photographing again or changing the position of the image box. In an AI dialog product, after a user uploads an image with an unclear intent, the AI dialog product will attempt to provide possible answers based on existing information, or to obtain more information through generic guidance, such as: "I am not sure about your specific requirements, can you provide more information or embody your question? In this way, I can help you better". This guidance method is vague and lacks personalization. If the user cannot accurately express his or her own requirements, this guidance statement lacks direction, which will cause the user to spend more time and energy on expressing the requirements and rely on the user's expression ability, thereby reducing the search efficiency while failing to guarantee satisfaction, which may further reduce the user's trust in AI products.
2. Lack of Understanding Scenarios for New Functions:
   with the development of the technology, more new functions are realized in the image recognition product. However, the new functions are often taught to new users through animations and example pictures. This method will consume users' time and understanding costs. It may achieve good results for tool functions (such as translation, text extraction, code scanning, etc.), but for non-tool functions, particularly those combined with AI (such as image-to-image, image-to-text, etc.), this teaching method cannot make users clearly understand the usage scenarios of the new functions.
3. Lack of Response to Extended Requirements:
   when searching, the user may have an extended requirement other than cognition, for example, when photographing an commodity, the user may have an extended requirement of comparing prices. However, when searching based on an image, the search result of the conventional image recognition product cannot satisfy the extended requirement.

In order to at least partially solve one or more of the above problems and other potential problems, the present disclosure provides an image-based search processing method. When searching based on an image, a first requirement corresponding to the image is first determined by a server, the first requirement including an original search intent of the user; when the first requirement meets a recommendation triggering condition, a search result and a recommended content corresponding to the image are generated according to the first requirement, and then a first round of reply is performed by a terminal based on the image search, and the search result and recommended content are output on a search result page. When searching based on an image, the approach of outputting the search result and recommended content in the first round of reply is adopted, and when the search result cannot meet the user's requirements, the user can quickly clarify the search requirement through the recommended content without needing to re-photograph and upload an image and without needing to spend more time and energy to express the requirements, which may improve the search efficiency, enhance the intelligence and convenience of the search, and thus improve the search experience.

An embodiment of the present disclosure provides an image-based search processing method, which may be applied to a server having an image search function and supporting image search, image recognition, requirement guidance, function recommendation, and the like. In practical applications, the server includes, but is not limited to, an ordinary server, a cloud server, and the like. As shown in FIG. 1, the image-based search processing method may include:
   S101: determining, in response to receiving an image sent by a terminal, a first requirement corresponding to the image, where the first requirement includes an original search intent;
   S102: generating a search result and a recommended content corresponding to the image according to the first requirement in a case where the first requirement meets a recommendation triggering condition; and
   S103: returning the search result and the recommended content to the terminal to cause the terminal to output the search result and the recommended content on a search result page.

In the embodiment of the present disclosure, a search application client is provided on the terminal, and the search application client supports an image search function. In the first page search box of the search application, a camera entrance icon is provided, and by triggering the camera entrance icon, a user may directly take an image and search for the image. Alternatively, by triggering the camera entrance icon, the user may also select an image from the photo album as an image for search.

In the embodiment of the present disclosure, the original search intent refers to an initial and direct purpose or requirement held by a user when performing a search operation. When users upload images for search, they typically have certain targets or requirements that constitute their original search intents. The original search intent may cover a number of types, including but not limited to the following types: 1. information acquisition: a user may want to know more about a concept, an event, a character, or a product; 2. solving a problem: a user may encounter a problem and wish to find a solution or suggestion through a search; 3. purchase decision: a user may be considering purchasing a product or service and would like to compare different options or find product comments by searching; 4. entertainment or recreation: a user may simply want to find some interesting contents to spend time, such as watching a video, reading an article, or browsing an image; 5. navigation or locating: a user may want to find an exact position or contact information of a location, a merchant, or an event; 6. comparison or evaluation: a user may want to compare the advantages and disadvantages of different products or services in order to make decisions. The foregoing is merely an exemplary description and is not intended to limit all possible content of the original search intent, but is not exhaustive herein.

In the embodiment of the present disclosure, the recommendation triggering condition is a triggering condition preset by the system for generating the recommended content based on the image. The recommendation triggering condition may be set or adjusted according to different image contents or original search intent to ensure accuracy, relevance and necessity of the recommended content. In some implementations, the recommendation triggering condition may be based on a series of preset rules or algorithms for determining whether to generate a recommended content for the user.

In the embodiment of the present disclosure, the recommended trigger condition may include at least one of the following: code class information (e.g., a two-dimensional code, a bar code, etc.) is not included in the image; a plurality of different types of objects (e.g., beach and surfboard, table and cup, keyboard and flower, etc.) is included in the image; a plurality of same types of objects (e.g., pedestrians in a crowd, viewers on a stand, a plurality of ceramic bowls, a plurality of books, a plurality of pairs of shoes, etc.) is included in the image. The foregoing is merely an exemplary description and is not intended to limit all possible ways of recommendation triggering condition, but is not exhaustive herein. In practical applications, the system may adjust the range of the recommendation triggering condition according to the current resource utilization rate, so as to help the system to provide the user with timely and relevant recommended content while maintaining efficient and stable operation.

In the embodiment of the present disclosure, the search result is a search result generated based on a first requirement of an image. Here, the search result may be an image recognition result including, but not limited to, at least one of: text recognition in an image: text content in an image; text of an image description: descriptive text generated based on the image content; image information: other images similar to uploaded images; image source: providing the original source or link of the image; object recognition in an image: recognition of an object, a face, a scene, and the like in an image; a web page or product information: a purchase link, a user evaluation, and the like of a commodity may be returned when the commodity is recognized; video: if the image is part of a video, the associated video segment or the entire video may be returned; audio: audio file or sound description related to image content; if the image relates to a web page or online content, a link to the web page may be returned; knowledge information: encyclopedic knowledge, explanation, or background information based on the image content, information, such as culture, history, science, or the like, related to an object or scene in an image; position information: if the image contains a landmark or a specific location, position information of the location, a map, travel advice, and the like may be returned; social media content: if an image has been shared on social media, relevant posts, user comments, or tags may be returned. The foregoing is merely an exemplary description, and is not intended to limit all possible contents of the image recognition result, but is not exhaustive herein.

In the embodiments of the present disclosure, the recommended content is used to help the user more clearly express or understand the search intent and to provide the user with content that is likely to operate further. For example, the recommended content is a series of additional contents, suggestions, alternative search options, or prompts to further clarify requirements that are automatically recommended to the user in relation to or may be of interest to the original search intent. When the image uploaded by the user is not clear enough or the search intent is not specific enough, the recommended content may help the user to further clarify what he or she wants to search, and help the user to clarify the search requirement.

In practical applications, the recommended content may include: other images similar to the original image; keywords or tags related to the original search intent; hot or trending content related to the original search intent; possible search intent clarification hints (e.g., "Are you looking for XX brand products?"); relevant classification or subcategory recommendations; relevant user evaluations or comments, etc.

In the embodiment of the present disclosure, the recommended content may include a recommended content generated based on a first requirement of an image. The specific recommended content may vary depending on the content of the image and the original search intent of the user. Recommended content that may be generated based on image content includes, but is not limited to: 1. commodity recommendation: if an image shows a product (e.g., clothing, an electronic product, a household good, etc.), then similar commodities, matching commodities, similar commodities of different colors or sizes, similar commodities with high user evaluation, etc., may be recommended; 2. tourism recommendation: if an image is a photograph of a tourist attraction, then a tourist package, a surrounding hotel, a local characteristic cuisine, a transportation mode, a travel strategy, and the like of the tourist attraction may be recommended; 3. style or design recommendation: if an image shows a particular design style (e.g., interior design, clothing design, artwork, etc.), then other design works, designers, design courses, or design software of a similar style may be recommended; 4. book or movie recommendation: if an image is similar to the cover of a book or movie, then a book or movie, as well as a book, movie or TV play of the relevant subject may be recommended; 5. food recommendation: if an image shows a dish or a food material, then a recipe of the dish, a cooking skill, a purchase link of a related food material, a restaurant in the vicinity where the dish is provided, etc. may be recommended; 6. a celebrity or an artist recommendation: if an image is a photograph or a work of a celebrity or an artist, then other works, related news, social media accounts, concert or exhibition information, and the like of the celebrity or the artist may be recommended; 7. tutorial or teaching material recommendation: if an image shows steps of a skill or activity (e.g., handicraft, cooking, fitness, etc.), then a tutorial, a teaching video, an online course, or a book related to the skill may be recommended; 8. accessory recommendation: if an image is a product (e.g., a mobile phone, a camera, an automobile, etc.), then fittings, accessories, protective sleeves, extension devices, etc., compatible with the product may be recommended; 9. health or fitness recommendation: if an image shows a fitness exercise or health food, then a related fitness plan, health diet, fitness equipment, or nutritional supplement may be recommended; 10. service or application recommendation: if an image is related to a certain service or application (e.g., a web page entered by scanning a two-dimensional code, intra-game screenshot, etc.), then the related service, application, preferential activity, etc., may be recommended. The foregoing is merely an exemplary description, and is not intended to limit all possible contents of the recommended content, but is not exhaustive herein.

In the embodiment of the present disclosure, a search result page refers to a result page presented after a search application client receives an image shot by a user. The present disclosure does not define the page layout style and style of the search result page.

In practical applications, after receiving an image shot by a user, a search application client provided on a terminal sends the image to a server, the server determines a first requirement of the image, and generates a search result and a recommended content corresponding to the image according to the first requirement in a case where the first requirement meets a recommendation triggering condition; the server returns the search result and the recommended content to the terminal to cause the terminal to output the search result and the recommended content on a search result page. That is, the user only needs to upload the image, i.e., after the user uploads the image and before the search application client outputs the first round of search result, the search application client may directly output the search result and recommended content corresponding to the image without the user inputting any other auxiliary information. According to the technical solution of the embodiment of the present disclosure, the server determines, in response to receiving an image sent by a terminal, a first requirement corresponding to the image; the server generates a search result and a recommended content corresponding to the image according to the first requirement in a case where the first requirement meets a recommendation triggering condition, so that the terminal outputs the search result and the recommended content on a search result page in the first round of reply. Compared with a case in which a server returns a search result according to an image and a query term sent by a terminal, the present disclosure does not require a user to input a query term while inputting an image, which simplifies an image search flow, and contributes to improving search efficiency and search experience. Compared with a processing approach of outputting only a search result, the present disclosure outputs a recommended content while outputting a search result, without requiring the user to spend more time and energy on expressing requirements, and the user can quickly clarify a search intent based on the recommended content, thereby helping to reduce a search quantity and improve search efficiency. It also helps to improve the accuracy of the search, thereby improving the satisfaction of the search result.

In the embodiment of the present disclosure, the recommended content includes at least one of the following:
- a guidance content, where the guidance content includes a first type of information for guiding the user to clarify a search intent;
- a content of asking in return, where the content of asking in return includes a second type of information for exploring the user to clarify a search intent; or
- a function entrance; where the function entrance is used to represent an entrance of an available function recommended for the user.

In some implementations, the guidance content is typically used to prompt the user to further clarify his/her search intent or guide he/she to a more specific search direction.

Exemplarily, if the user uploads an image containing multiple flowers, the recommended content may include: "Seeing that you uploaded a flower image, do you want to know the name of the flowers, the maintenance method, or look for a purchase link?".

Exemplarily, if the user uploads an image containing a pair of shoes, the recommended content may be: "Are you looking for a different color of this type of shoes? Or would you like to know their size and inventory?".

In some implementations, the content of asking in return explores the user's true intent by asking questions to help the system more accurately understand the user's requirements.

Exemplarily, after the user uploads a landscape image, the recommended content may ask in return: "Do you want to travel to this place? We have some travel packages and guides for your reference."

Exemplarily, for an image of a dish, the recommended content may ask in return: "Do you want to learn how to make this dish? We have a detailed recipe and a video tutorial."

In some implementations, the function entrance directly provides the user with an entrance of an available function or service, to facilitate the user's rapid access to the next step of operation.

Exemplarily, while presenting an image search result, a function entrance of "more similar images" may be provided to enable the user to view more relevant images.

Exemplarily, when recommending a commodity, a function entrance of "add to cart" or "buy now" may be provided to facilitate the user to purchase directly.

Exemplarily, if the user searches for a certain service (e.g., travel, repair, etc.), the recommended content may include a function entrance of "booking service" or "contact customer service".

The foregoing is merely an exemplary description, and is not intended to limit all possible contents of the recommended content, but is not exhaustive herein. In practical applications, the information, such as the user's search history, browsing behavior, geographic position, personal preference and the like, that the user agrees to disclose may also be combined when generating these recommended contents to ensure the accuracy and personalization of the recommendations.

As such, the recommended content is more humanized and intelligent, and the personalized requirements of the user may be more accurately met. By analyzing the user's feedback and behavior data for the recommended content, it is possible to quickly gain insight into the user's search intent and preferences, thereby providing more accurate and user-desired search results, and improving the accuracy and validity of the recommendation.

In the embodiment of the present disclosure, determining the first requirement corresponding to the image includes: determining a description model corresponding to a content type of the image; generating image content description information of the image based on the description model; and determining the first requirement based on the image content description information.

In some implementations, objects such as characters, animals, natural scenery, commodities, and the like in an image are recognized using an image classification model or an object detection algorithm to obtain a content type of the image. Here, the image classification model may perform image classification and object detection using a computer vision technology. It should be noted that the image classification model is a pre-trained model, and the training method and structure of the image classification model are not limited in the present disclosure. Any algorithm capable of detecting an object in an image may be used as the object detection algorithm of the present disclosure, and the present disclosure does not impose a mandatory limitation on the object detection algorithm.

In the embodiment of the present disclosure, the description model may be a predefined template, a rule set, or a machine learning model.

There may be different description requirements and focuses for different content types. For example, for a commodity image, it may be necessary to describe attributes, such as the brand, model, color, and the like, of the commodity; while for a natural scenery image, it may be necessary to describe the overall atmosphere, the main scenic spots, and the like.

In some implementations, a predefined template or rule set may be used to generate a basic description. For example, for a commodity image, there may be a template containing fields such as brand, model, color, and the like.

In some implementations, for more complex scenarios, a machine learning-based text generation model may be used to generate a more natural and more detailed description.

In some implementations, a description model is applied to generate description information of image content using an image as an input. This generally involves converting image features into natural language text. Specifically, image elements (e.g., recognized objects, colors, textures, etc.) are input as features into a description model, and the description model generates a corresponding natural language text description (which may specifically be a simple sentence, phrase, or paragraph) according to these features. Further, a language generation technology (e.g., text digest, text generation, etc.) may also be used to optimize the generated description information to make it smoother and more understandable.

In some implementations, generating image content description information of an image based on a description model, includes:

when the content type is a two-dimensional code or a barcode, recognizing a link of the two-dimensional code or information of the barcode by a code recognition technology;

when the content type is a text or a title, recognizing the text information in the image by an Optical Character Recognition (OCR) technology;

when the content type is a character or a plant, generating a word guessing result (such as, this is xxx) by a word guessing model. If no result is generated by the word guessing model, then generating image content description information using a multi-modal large language model; and when the content type is a material, a face, an animal, an expression, a commodity, or other type, generating image content description information (such as, this is an image of a tire pressure alarm on a dashboard of an L automobile) using a multi-modal large language model.

In the embodiment of the present disclosure, the image content description information may be description information generated according to features such as an object, a scene, a color, and the like in the image.

In some implementations, determining a first requirement according to image content description information includes: performing a semantic analysis on the image content description information; extracting keywords, phrases or themes in the image content description information, where the keywords may be nouns, verbs, adjectives or other words having a specific meaning; weighting or filtering the keywords, for example, weighting the extracted keywords, and setting weights according to factors such as the importance of the keywords in the sentence, the occurrence frequency, or the correlation with the search history of the user; filtering out unimportant and repeated keywords or keywords that do not conform to the user's search habits; and determining the user's primary concerned points or requirements by the weighting and filtering. Further analyzing the user's intents and requirements using Natural Language Processing (NLP) technologies such as text classification, emotional analysis, and the like. For example, classifying description information into a predefined category using a text classification technology to more accurately understand the user's intents; determining a user's emotional attitude to the image content using an emotional analysis technology, which helps to infer the user's potential requirements or preferences; and entity recognition may further recognize entities, such as brands, products, locations, and the like, in the description information, where the entities may be closely related to the user's search intent. In combination with information such as keywords, categories, emotional tendencies, and entities obtained in the above steps, the intent and requirements of the user are comprehensively analyzed, and then the original search intent of the user is determined, that is, what type of information the user wishes to obtain or what requirements the user wishes to meet by searching. Finally, the original search intent of the user is translated into a specific, executable search and recommendation requirement, i.e., a first requirement. The first requirement may include specific conditions such as a search keyword, a category, a geographic limitation, a time range, a target range, and the like, so that the search and recommendation system finds a content that meets the user's requirements based on the first requirement.

In some implementations, determining the first requirement based on the image content description information includes: analyzing the image content description information, comprehensively analyzing an intent and a requirement of the user in combination with a user context such as a history search record, a user portrait, and the like, thereby determining the original search intent of the user; and converting the original search intent of the user into a specific and executable search and recommendation requirement, i.e., the first requirement.

As such, by generating the image content description information according to a description model adapted to the content type of the image, and determining the first requirement of the user accordingly, the accuracy of the determined first requirement may be improved, thereby improving the accuracy of the search result and the recommended content, and improving the search efficiency.

In some implementations, determining the first requirement corresponding to the image includes: analyzing respective objects in the image to obtain an intent inference result corresponding to the image, the intent inference result including a target object in the image; generating image content description information of the image based on a description model adapted to a content type of the image; and determining the first requirement according to the intent inference result and the image content description information.

In some implementations, the system may use a computer vision technology such as a convolutional neural network, an object detection algorithm, or the like, to recognize and locate respective objects in the image. The system first performs detailed analysis of the respective objects in the image, including, but not limited to, objects, colors, textures, layouts, spatial relationships, and the like, in the image.

In some implementations, the system further infers the intent of the image based on the recognition result of respective objects in the image. The intent inference result typically includes a target object in the image, which is critical to understanding the image intent. The target object may be a single object (such as a commodity, an animal, a building, or the like), or may be a combination of multiple objects or a particular scene. The intent inference may also involve analysis of the relationship between objects, properties of objects (such as color, size, shape, and the like), and the arrangement of objects, etc.

In some implementations, the intent inference is performed using a machine learning or deep learning model to derive one or more possible intent inference results corresponding to the image.

In some implementations, determining the first requirement from the intent inference result and the image content description information includes: determining the original search intent in combination with the intent inference result and the image content description information; and determining the first requirement according to the original search intent.

In some implementations, processing the image content description information in combination with the intent inference result to obtain the first requirement includes: converting the image content description information into a search query statement; processing the search query statement according to the intent inference result to obtain the first requirement; where the first requirement can more accurately express the original search intent of the user.

Here, processing the search query statement includes but not limited to: adding an appropriate modifier, a qualifier, or a search operator.

Exemplarily, after obtaining the image content description information, the system processes the image content description information in combination with a previously obtained intent inference result. The target object in the intent inference result may be particularly emphasized or focused in the image content description information in order to more accurately determine the first requirement of the user. For example, if the intent inference result indicates that the user may be looking for a particular commodity, the system may pay particular attention to the portion of the description information related to the commodity, and use it as the first requirement.

As such, by analyzing respective objects in the image to infer the intent behind the image and combining the intent inference result with the image content description information to determine the first requirement of the user, the accuracy of search and recommendation may be effectively improved. The image content description information combined with intent inference may more accurately reflect the real requirements of the user, thereby improving the accuracy of search and recommendation, and helping to reduce uncorrelated or low-quality search results and recommended contents. In addition, the introduction of intent inference enables the system to more deeply understand the user's search intent, thereby providing a more intelligent and personalized service.

In the embodiment of the disclosure, determining the first requirement based on the intent inference result and the image content description information includes: determining the original search intent in combination with the intent inference result and the image content description information; and determining the first requirement according to the original search intent.

In some implementations, the intent inference result is fused with the image content description information for analysis. For example, if the intent inference result indicates that the user may be looking for a "travel destination", and a scene of "beach" and "sunset" is recognized from the image description information, then it may be more accurately inferred that the original search intent of the user is to find a "beach resort". Based on the result of the fusion analysis described above, the system may determine the original search intent of the user and further determine the first requirement meeting this intent. For example, for the search intent of "beach resort", the first requirement may include recommending a specific beach resort, a travel package, a travel playbook, and the like.

As such, by determining the original search intent based on the intent inference result and the image content description information, the system can more fully understand the search requirements of the user, thereby improving the accuracy of inferring the original search intent, thereby improving the accuracy of the first requirement. The accurate original search intent and the first requirement may guide the system to provide a more accurate and more relevant search result and recommended content, thereby improving the accuracy of the search result and the recommended content.

In the embodiment of the present disclosure, generating the search result and the recommended content corresponding to the image according to the first requirement includes: generating the search result corresponding to the image according to the first requirement, where the search result includes a search result obtained based on an original search intent; and generating the recommended content corresponding to the image according to the first requirement and the search result.

In some implementations, generating the search result corresponding to the image according to the first requirement includes: generating a search result related to the image based on the original search intent and a result of image content analysis. The search result typically includes the content for directly responding to the original search intent of the user and relating to the image content as much as possible. For example, if the user uploads an image containing a certain plant, the system may recognize the plant species in the image and return information about the plant as a search result.

In some implementations, the system may further generate a recommended content based on the first requirement and the search result, either simultaneously with or after generating the search result. Here, the recommended content may be other resources similar to the search result, related topics or products that the user may be interested in, and personalized recommendations based on user behavior and preferences, etc., which may provide the user with more relevant information or options to help them more fully understand or meet their requirements.

As such, by generating the search result and the recommended content corresponding to the image according to the first requirement, the search intent of the user may be more accurately understood, and the search result and the useful recommended content closely related to the image content may be provided, thereby improving the search efficiency.

In the embodiment of the present disclosure, generating the recommended content corresponding to the image according to the first requirement includes: determining a requirement category of the first requirement; and invoking a recommendation strategy corresponding to the requirement category to generate the recommended content.

In some implementations, the first requirement may include:
  a first type of requirement, the first type of requirement including that the target subject cannot be determined from the image;
  a second type of requirement, the second type of requirement including a relationship between any at least two subjects in the image, the at least two subjects in the image being target subjects; and
  a third type of requirement, the third type of requirement including a requirement (such as an extensible requirement or a consumer requirement) other than the cognitive requirement.

In some implementations, determining the requirement category of the first requirement includes:
  analyzing the first requirement of the user, and if an explicit target subject cannot be directly recognized from the image, then classifying the requirement as the first type of requirement. This situation may be due to that the image content is blurred and the subject is unclear.

In some implementations, determining the requirement category of the first requirement includes:

analyzing the first requirement of the user, if the first requirement of the user relates to a relationship between any at least two subjects in the image, and the subjects belong to the same category (i.e., the same category of subjects), then classifying the requirement as the second type of requirement. For example, the user may want to know the relationship between two characters in the image, or a comparison between two similar objects in the image.

In some implementations, determining the requirement category of the first requirement includes:

analyzing the first requirement of the user, and if all other requirements except the above two types of requirements are included, classifying the requirements as the third type of requirements. The third type of requirement may involve information, related to the image content but not directly recognizable, for example, the background information such as the source of the image, the time of shooting, the location, and the like, or other requirements that are not directly related to the image content.

In some implementations, the recommendation strategy for the first type of requirement includes:

for the first type of requirement, some topics or categories related to the image content but broader are recommended to help the user to further clarify the search intent.

For example, some common related topics, related search results, or similar images that the user may be interested in may be recommended.

In some implementations, the recommendation strategy for the second type of requirement includes:

for the second type of requirement, the focus is on analyzing the relationship between the subjects in the image and generating a relevant recommended content. This may include explanations, comparisons, analyses, or other relevant information about the relationships between the subjects, and other resources such as images, articles, videos, etc. related to these subject relationships may also be recommended.

In some implementations, the recommendation strategy for the third type of requirement includes:

for the third type of requirement, the system needs to make personalized recommendations according to specific requirements.

This may involve invoking other modules or services to obtain relevant information, such as image recognition, knowledge maps, user portraits, and the like. The recommended content may include background information related to the image content, relevant knowledge, other content that the user may be interested in, etc.

In some implementations, outputting the recommended content includes:

regardless of the types of requirements, the generated recommended content will be presented to the user in a suitable manner, such as through a search result page, a pop-up window, a push notification, or the like. Here, the display manner should be concise and clear, and easy for the user to understand and operate.

As such, when the recommended content corresponding to the image is generated according to the first requirement of the user, the requirement category is determined and the corresponding recommendation strategy is applied, so that the system can provide more accurate and personalized recommended content according to the specific requirements of the user, thereby improving the search experience and satisfaction of the user.

In the embodiment of the present disclosure, generating the search result corresponding to the image according to the first requirement includes: generating the search result based on at least two target objects in a case where the first requirement includes at least two target objects.

If the number of objects in an image is large or the similarity therebetween are high, more complex algorithms or technologies may be needed to accurately recognize the target object. For example, a deep learning model may be used to perform a finer analysis on the image, or to assist in determining the target object in combination with a historical search record of the user, context information, or the like.

In some implementations, generating the search result based on at least two target objects includes:

determining an appropriate search strategy according to a characteristic of the target object and the first requirement of the user;

performing a search operation using the search strategy to obtain the search result related to the target object.

In some implementations, generating the search result based on at least two target objects may further include at least one of:

further processing and filtering acquired search results to remove a duplicate, uncorrelated or low-quality content; and sorting, categorizing or organizing the search results as required to facilitate easier browsing and selecting by the user.

As such, if the first requirement involves at least two target objects, more relevant and valuable search results are generated based on the target objects, thereby improving the accuracy of the search.

In some embodiments, the image-based search processing method further includes: determining, in response to receiving a follow-up questioning request sent by the terminal, a new first requirement based on the follow-up questioning request, the follow-up questioning request being generated by the terminal based on a selection operation for the recommended content; generating a new search result and/or a new recommended content corresponding to the image according to the new first requirement; and returning the new search result and/or the new recommended content to the terminal to cause the terminal to output the new search result and/or the new recommended content on the search result page.

In some embodiments, the user's response operation to the recommended content may further serve as the feedback on the user's intent to help the system more accurately adjust the search result or recommended content.

In some implementations, receiving the response operation includes: when the user interacts with the recommended content (e.g., clicking a certain link, selecting a certain option, entering text, etc.), the system will receive these response operations. These response operations typically contain user's feedback on the current recommended content, and reflect the user's further requirements or preferences for the search result.

In some implementations, determining the new first requirement includes: the system will analyze the response operation of the user and infer a new requirement or intent of the user based on the response operation.

Here, the new first requirement may differ from the original search intent because it more specifically reflects the immediate requirement and interest of the user after seeing the recommended content.

In some implementations, the system may re-generate a search result or a recommended content based on the determined new first requirement. This process may involve reanalyzing the image content, updating the user context, adjusting the recommendation strategy, etc.

In some implementations, outputting the new search result or recommended content includes: the system will replace or supplement the original search result or recommended content on a search result page to present the new search result or recommended content. In this way, users may be helped to find information they are really interested in more quickly, which improves the search efficiency and satisfaction.

As such, by analyzing the response operation of the user and adjusting the search result or recommended content accordingly, the system can more deeply understand the user's intents and requirements, thereby providing a more intelligent and personalized service. By reducing unnecessary operation and browsing time of the user, the system can make more efficient use of computing resources and network resources and improve overall efficiency. In addition, the response operation of the user as a direct feedback mechanism may help the system continuously optimize the search and recommendation strategies and improve the accuracy and adaptability of the algorithm.

To further improve the accuracy of the search, on the basis of any of the above embodiments, the image-based search processing method may further include determining a second requirement corresponding to the image, the second requirement including a potential search intent of the user.

In some implementations, generating the search result and the recommended content corresponding to the image according to the first requirement includes: generating the search result corresponding to the image according to the first requirement in a case where the second requirement exists, the search result including a search result obtained based on the original search intent; and generating the recommended content corresponding to the image according to the second requirement, the recommended content including a search result obtained based on the potential search intent.

In some implementations, generating the search result and the recommended content corresponding to the image according to the first requirement includes: in a case where the second requirement exists, generating the search result corresponding to the image according to the first requirement, or generating the recommended content corresponding to the image according to the first requirement and the second requirement, where the search result at least includes a search result obtained based on the original search intent.

In some implementations, generating the search result and the recommended content corresponding to the image according to the first requirement includes: in a case where the second requirement exists, generating the recommended content corresponding to the image according to the second requirement, or generating the recommended content corresponding to the image in combination with the first requirement, the search result, and the second requirement, where the recommended content at least includes a search result obtained based on the potential search intent.

In the embodiment of the present disclosure, the second requirement is used to reflect a potential interest or requirement of the user, the second requirement may differ from the first requirement, but is also important. The recommended content may include other information, resources, or suggestions related to the potential interest or potential search intent of the user aiming to provide users with richer choices and deeper exploration opportunities.

In the embodiment of the present disclosure, the potential search intent refers to a search requirement or point of interest that the user may have, but is not explicitly expressed during a search process. These requirements or points of interest may be related to the original search intent, but more extensive or in-depth. The system may infer the potential search intent by analyzing factors such as user behaviors, historical search records, context information, and the like. Exemplarily, the potential search intent includes, but is not limited to: 1. Similar items or substitutes: a user uploads a picture of a commodity. In addition to looking for details of the commodity, the user may also be interested in commodities of similar style, functionality, or price. For example, the user uploads a picture of a smart watch, and the potential intent may be to look for other brands or models of smart watches. 2. Related fittings or accessories: a user may also be interested in fittings or accessories related to an item when searching for the item. For example, the user uploads a picture of a camera, and the potential intent may be to look for accessories such as camera packs, lenses, filters, and the like. 3. Usage tutorials or tips: a user may be interested in how to use or maintain a searched item. For example, the user uploads a picture of a kitchen appliance, and the potential intent may be to look for a usage tutorial or repair guide for the appliance. 4. Style or design inspiration: a user may wish to look for other relevant design inspiration or styles based on the style or design of the searched item. For example, the user uploads a picture of a modern home ornament, and the potential intent may be to look for more suggestions on the modern style home ornament. 5. Price comparison or preference information: a user may want to know the market price of the searched item or to find preference information. For example, the user uploads a picture of an electronic product, and the potential intent may be to find the lowest price or discount information for the product. 6. Brand or manufacturer information: a user may want to know more about the brand or manufacturer of the searched item. For example, the user uploads a picture of a brand-name bag, and the potential intent may be to look for the brand's official website or learn more about the brand. 7. Social media sharing or discussion: a user may want to share the searched item on social media or participate in related discussions. For example, the user uploads a picture of a fashion garment, and the potential intent may be to find social media topics or community discussions related to the garment. The foregoing is merely an exemplary description and is not intended to limit all possible content of the potential search intent, but is not exhaustive herein.

As such, by comprehensively considering the first requirement and the second requirement of the user, not only the direct requirement of the user is satisfied, but also the potential requirement and interest of the user are considered, and a more comprehensive and personalized search result and recommended content may be provided, thereby improving the search experience and satisfaction of the user.

In the embodiment of the present disclosure, generating the recommended content corresponding to the image in combination with the first requirement, the search result, and the second requirement includes: integrating the first requirement, the search result, and the second requirement to obtain comprehensive user requirement information; and generating the recommended content corresponding to the image based on the comprehensive user requirement information.

In some implementations, generating the recommended content corresponding to the image based on the comprehensive user requirement information includes: determining a recommendation strategy based on the comprehensive user requirement information; and invoking the recommendation strategy to generate the recommended content corresponding to the image.

In some implementations, generating the recommended content corresponding to the image based on the comprehensive user requirement information includes: adjusting a weight of the recommended parameter based on the comprehensive user requirement information; and generating the recommended content corresponding to the image based on the weight of the recommendation parameter. First, the system needs to collect and integrate the first requirement (including the original search intent), the second requirement (including the potential search intent), and possibly other relevant information (such as the user's historical search records, behavior patterns, context information, and the like) of the user. These pieces of information together constitute the comprehensive user requirement information. Next, the system analyzes the comprehensive user requirement information to identify points of interest, preferences, and possible search omissions or deficiencies of the user. Based on the analysis of the user requirement information, the system adjusts the weight of the recommendation parameters. The recommendation parameters may include content relevance, user interest level, timeliness, diversity, and the like. Different parameters may have different significance for different users or different search scenarios. The recommended content may include other information related to the subject of the image, related images, videos, articles, user evaluations, etc. The system may also continuously optimize the recommended content based on user's feedback and real-time data.

As such, the recommended content is generated in combination with the first requirement, the search result, and the second requirement, so that the recommended content that more meets the expectations of the user is generated, and a more comprehensive and personalized service may be provided, thereby meeting the diversified requirements of the user, and improving the search experience and satisfaction of the user.

In the embodiment of the present disclosure, determining the second requirement corresponding to an image includes: determining a search stage of the original search intent; predicting the potential search intent based on the search stage of the original search intent; and determining the second requirement based on the potential search intent.

In some implementations, the search stage generally refers to different phases of the user's search process that reflect different requirements and information requirement levels of the user. The search stage includes, but is not limited to: an awareness stage: the user is aware of that he/she has a requirement or problem, but he/she may not be clear what it is; an information search stage: the user begins to actively search for information related to the requirements; an evaluation stage: the user collects and evaluates information from different sources in order to make a decision; and a purchase/action stage: the user takes actual actions such as purchasing, downloading, contacting, and the like based on the information provided by the system. By analyzing the images input by the user and possible context information (e.g., search histories, browsing behaviors, etc.), the search stage in which the user is currently located may be determined.

In some implementations, predicting the potential search intent based on the search stage of the original search intent includes: predicting the potential search intent of the user after determining the search stage in which the user is located. This generally involves speculation about the information that the user may be interested in or desired at the current stage. For example, if the user is in the information search stage, they may be looking for details about a product, comparing different products, looking for prices, etc. Based on these potential requirements, the potential search intent of the user may be predicted.

In some implementations, determining the second requirement based on the potential search intent includes determining the second requirement of the user based on the predicted potential search intent. These second requirements are generally more specific or in-depth requirements related to the original search intent. For example, if the original search intent is to look for a camera and the users are in the information search stage, their second requirement may be to understand the detailed specifications of the camera, view user reviews, compare different models of cameras, etc.

As such, by determining the search stage of the original search intent to predict the potential search intent and finally determining the second requirement, a more accurate and personalized search result and recommended content may be provided, and more accurate prediction and recommendation may be achieved.

In the embodiment of the present disclosure, determining the second requirement corresponding to the image includes: determining a concerned point corresponding to the image based on the first requirement; obtaining relevant content corresponding to the first requirement based on the concerned point; and determining the second requirement based on the relevant content.

In some implementations, determining the concerned point corresponding to the image based on the first requirement includes: recognizing key elements (such as objects, scenes, activities, and the like) in the image based on the original search intent; and determining the main concerned point from the identified key elements. For example, if a user uploads a landscape picture, the system may identify elements such as a mountain, a lake, a tree, and the like in the image and determine that the concerned point of the user may be a natural landscape or a tourist attraction.

In some implementations, obtaining the relevant content corresponding to the first requirement based on the concerned point includes using a search engine, database, or online resource to find text, an image, a video, or other media content that matches the concerned point. For example, if the concerned point is the natural landscape, the system may search for contents, such as travel guides, photographic works, historical information, and the like, related to mountains, lakes, trees, etc.

In some implementations, determining the second requirement based on the relevant content includes: after the content related to the original search intent is acquired, the system may begin to analyze the content to infer the potential search intent of the user. This generally involves semantic analysis of the content, subject modeling, or machine learning technologies to identify potential points of interest or requirements in the content. For example, after analyzing the content related to natural scenery, the system may find a user's interest in other similar scenic spots, or a requirement for travel planning, photography skills, etc. All of these may be considered as the potential search intent.

In some implementations, the system may also automatically optimize the determination of the second requirement using data analysis and machine learning technologies. By analyzing a large amount of sample data, the system can learn how to more accurately identify the potential requirements of the user and constantly improve the quality of searches and recommendations.

As such, determining the second requirement based on the first requirement is a reasoning process from specific to abstract, from explicit to implicit. Combining the relevant content to determine the second requirement may improve the quality of the second requirement, and then provide a more accurate and personalized search result and recommended content, thereby helping to meet the diversified requirements of the user, improving the accuracy and personalization of the search, and improving the search experience. In addition, the system can allocate resources more intelligently, such as prioritizing the search request or recommended content related to the second requirement. Meanwhile, the system can also adjust the recommendation strategy according to the second requirement to improve the accuracy and efficiency of the recommendation.

In the embodiment of the present disclosure, the image-based search processing method may further include: determining, in response to receiving a follow-up questioning request sent by the terminal, a new second requirement based on the follow-up questioning request, the follow-up questioning request being generated by the terminal based on a selection operation for the recommended content; generating a new search result and/or a new recommended content corresponding to the image according to the new second requirement; and returning the new search result and/or the new recommended content to the terminal to cause the terminal to output the new search result and/or the new recommended content on the search result page.

In some implementations, the selection operation for the recommended content includes: when the user interacts with the recommended content, such as clicking on, viewing, commenting on, or sharing a certain recommendation item, the system will receive these response operations as input of the user's feedback.

In some implementations, determining the new second requirement based on the follow-up questioning request includes: analyzing the response operation of the user to know which types of recommended content the user is more interested in, which content is ignored, and whether the user's behavior pattern has changed. Based on these analyses, the system will attempt to determine a new potential search intent or concerned point of the user, i.e., the new second requirement.

In some implementations, generating the new search result corresponding to the image based on the new second requirement includes: deeply resolving the new second requirement to understand the intent and expectation behind the new second requirement; converting the new second requirement into an executable search or analysis parameter; and performing the searching based on the executable search or analysis parameter, and applying a recommendation algorithm to filter or generate a content related to the image as a new search result. In practical applications, the use of collaborative filtering, content filtering, or hybrid search strategy may be considered. In addition, the search results may be filtered according to a new second requirement to exclude irrelevant or low-quality content.

In some implementations, generating the new recommended content corresponding to the image based on the new second requirement includes: re-evaluating a recommendation strategy after determining the new second requirement, adjusting a parameter of the recommendation strategy based on the new requirement; and generating the new recommended content related to the image based on the new recommendation strategy. The new recommendation content will more accurately reflect the current interest and requirement of the user.

As such, the recommendation strategy is dynamically adjusted and new recommended content is generated according to the user's response operation to the recommended content, thereby enhancing the intelligence and personalization of the search and recommendation system. By responding to real-time feedback of the user and dynamically adjusting the recommendation strategy, the system can adapt to changes of the user more quickly and provide more accurate and timely recommendation services. Users feel that the system can "understand" their interests and requirements and provide valuable recommendations during the search process, which will greatly enhance their search experience. Personalized recommended content can attract the attention of the user and increase their interaction with the system, thereby improving the participation and stickiness of the user. The system can adjust the resource allocation according to the real-time feedback of the user, and use more resources to generate recommended content that the user is interested in, thereby improving the resource utilization efficiency. By constantly learning and adapting to the behavior of users, the system can constantly improve its intelligence and accuracy, and provide users with better service.

In some implementations, generating the recommended content corresponding to the image according to the second requirement includes: matching a target scenario for the second requirement; and providing a function entrance matching the target scenario, the function entrance being a function entrance adapted to the target scenario.

In some implementations, matching the target scenario for the second requirement may include:

searching for a target scenario that best matches the second requirement after determining the second requirement of the user. These application scenarios may cover a variety of potential requirements and use scenarios of the user, such as shopping, tour, learning, entertainment, and the like. The system will use an algorithm or machine learning model to match the most relevant target scenario based on factors such as the nature of the second requirement, keywords, historical data, behavior patterns of the user, and the like.

In some implementations, after determining the target scenario, the system will provide a function entrance matching the target scenario. These function entrances are interface elements that users can click or operate directly to further explore or meet their requirements. The design of the function entrance should meet the characteristics of the target scenario and user requirements. For example, if the target scenario is shopping, the function entrance may include a list of items, a search box, a shopping cart icon, or the like; if the target scenario is a tour, the function entrance may include a scenic spot recommendation, a trip plan, a hotel reservation, or the like.

As such, by providing a function entrance matching the target scenario, the system can more directly meet the requirements of the user, reduce the searching and browsing time of the user, and improve the searching efficiency. When the system is able to accurately match user requirements and provide corresponding function entrances, the user can feel the intelligence and convenience of the system, thereby enhancing satisfaction with the system.

In the embodiment of the present disclosure, the image-based search processing method may further include: generating a search result corresponding to the image according to the first requirement in a case where the first requirement does not meet a recommendation triggering condition; and returning the search result to the terminal to cause the terminal to output the search result on the search result page.

As such, in a case where the first requirement does not meet the recommendation triggering condition, by generating a search result corresponding to the image according to the first requirement, and outputting the search result on the search result page, it is ensured that the user can still obtain the basic search result related to their query even when the personalized recommendation cannot be provided, thereby ensuring the basic search experience.

In the embodiment of the present disclosure, before determining the first requirement of the image, the image-based search processing method may further include: performing a risk control detection on the image; and if the image meets a risk control criterion, entering a process of determining the first requirement of the image; otherwise, returning prompt information to the terminal, the prompt information being used to remind that the image is invalid.

In some implementations, the risk control detection may include various aspects, such as recognition, classification, keyword filtering, copyright check, and the like of the image content.

In some implementations, the risk control criterion may be pre-set by the system, or may be dynamically adjusted according to laws and regulations, user agreements, platform policies, and the like. These criteria are generally used to determine whether the image contains a bad content, infringes on the rights of others, complies with platform regulations, and the like.

In some implementations, if the image meets the risk control criterion, the system will proceed to a flow of determining the first requirement of the image, and generating an appropriate search result or recommended content for the user based on the user's query intent and image content. If the image does not meet the risk control criterion, the system will not proceed to a subsequent search flow, but will prompt the user that the image is invalid. This prompt may be presented in the form of text, a pop-up window, an alert tone, etc., informing the user that the image cannot be processed or that there is a security risk.

As such, by performing risk control detection on the image, a potential bad content or risk can be recognized and filtered in advance, thereby ensuring that the user does not touch harmful information or suffer loss when using the search service, and improving the search security.

In the embodiment of the present disclosure, before determining the first requirement of the image, the image-based search processing method further includes: performing a code detection on the image; and if the image meets a code detection criterion, skipping performing a flow of determining the first requirement of the image, obtaining a code detection result of the image by using a code detection model, and returning the code detection result to the terminal.

In some implementations, before determining the first requirement of the image, a code detection step is introduced to recognize and process images that may contain special codes (e.g., two-dimensional codes, bar codes, etc.). If the image contains such codes, the system may directly parse these codes to obtain relevant information, rather than further determining the first requirement of the image.

In some implementations, if the image meets the code detection criterion, i.e., the image contains a clear, complete and parsable code, the system will not continue to perform the flow of determining the first requirement of the image. The system will parse the code in the image through a code detection model (such as a two-dimensional code recognition algorithm, a bar code recognition algorithm, or the like) to obtain a code detection result. This result may be a web address, a string of text, an identifier, etc., depending on the information stored in the code. Depending on the code detection result, the system may take different subsequent operations. For example, if the decoding result is a web address, the system may directly guide the user to access the web address; if the decoding result is an identifier, the system may search the internal database for information related to the identifier and present it to the user.

As such, for the image containing a parsable code, the system can parse the code directly to obtain related information without further processing the image content, which can greatly improve processing efficiency and reduce unnecessary computational resource consumption.

Figure 2:
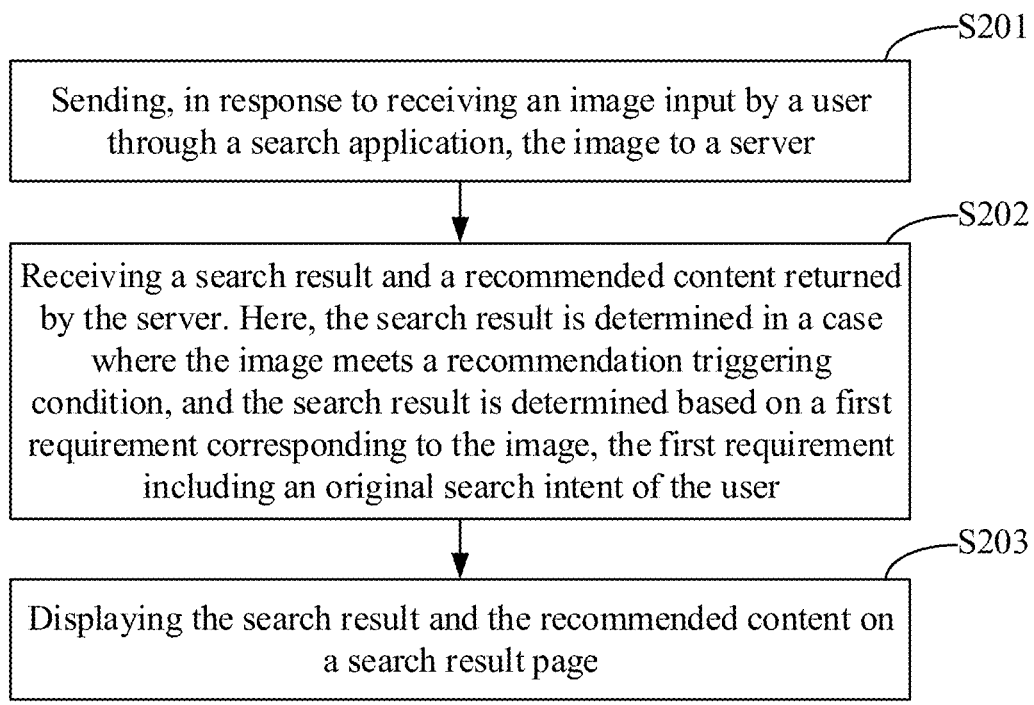
FIG. 2 is a schematic diagram of a flow of another image-based search processing method according to an embodiment of the present disclosure.

An embodiment of the present disclosure provides an image-based search processing method, which may be applied to a terminal on which a search application client is installed, the search application client having an image search function. In practical applications, the terminal includes, but is not limited to, a mobile phone, a tablet computer, a wearable device, a personal computer, or the like. As shown in FIG. 2, the image-based search processing method may include:

S201, sending, in response to receiving an image input by a user through a search application, the image to a server;

S202, receiving a search result and a recommended content returned by the server. Here, the search result is determined in a case where the image meets a recommendation triggering condition, and the search result is determined based on a first requirement corresponding to the image, the first requirement including an original search intent of the user; and S203, displaying the search result and the recommended content on a search result page.

In the embodiment of the present disclosure, the recommended content may include a content that is related to the image but different from the image to increase the diversity of the recommended content.

As such, after the terminal receives the image input by the user through the search application, the search application outputs the search result and the recommended content on its search result page in the first round of reply, and the combination of the image search and the recommended function can provide the user with richer search result and more comprehensive information display, thereby greatly improving the search efficiency. The user may find more content related to his interest by reviewing the recommended content, thereby obtaining a better search experience. In addition, the presentation of the recommended content can also increase the click rate and conversion rate of the user, and further increase the value of the search application.

In some implementations, the recommended content is generated based on the first requirement and the search result.

In some implementations, since the recommended content is generated based on the first requirement of the user (i.e., original search intent) and an actual search result, it is more likely to meet the user's actual requirements. Recommended content that is highly relevant to user's interests, preferences, or search goals can improve the user's satisfaction and overall search experience, enhancing the stickiness between the user and the platform.

As such, by generating the recommended content according to the first requirement and the search result, the accuracy and the relevance of the recommendation can be improved, and the intelligence and the adaptability of the system can be enhanced, so that the user's constantly changing requirements can be better met.

In some embodiments, the recommended content is generated based on the second requirement, the recommended content including a search result obtained based on a potential search intent.

In some implementations, by recognizing and analyzing the potential search intent of the user, the system can predict the potential requirement and extended requirement of the user in advance and provide the relevant recommended content. This greatly saves the time for the user to search again, and improves the search efficiency and the user search experience.

As such, by generating the recommended content based on the potential search intent of the user, the recommended content can be highly relevant to the potential requirement of the user, thereby ensuring that the user can directly access the content which they may be interested in but have not yet explicitly searched, and enhancing the relevance and accuracy of the recommended content.

In some embodiments, the recommended content is generated in combination with the first requirement, the search result, and the second requirement, where the first requirement includes the original search intent of the user, and the second requirement includes the potential search intent of the user.

In some implementations, in combination with the original search intent of the user and the search result, the system can accurately capture the user's immediate requirements and recommend content highly relevant thereto. Meanwhile, by considering the potential search intent of the user, the system can predict the future requirement of the user and further increase the accuracy of the recommendation.

A such, by generating the recommended content in combination with the first requirement, the search result, and the second requirement of the user, more accurate and more relevant recommended content can be provided, and a personalized recommendation service can be provided, thereby further improving the search experience and satisfaction of the user.

In some embodiments, the image-based search processing method may further include: sending a follow-up questioning request corresponding to a selection operation to the server in response to receiving the selection operation for the recommended content; and receiving a new search result and/or a new recommended content obtained by the server based on the follow-up questioning request, and displaying the new search result and/or the new recommended content on the search result page.

In some implementations, the selection operation for the recommended content by the user is monitored at the front-end interface of the search application. The selection operation may be a click, a touch, a slide or an other form of user input. Once a selection operation of the user is detected, necessary information (e.g., identity document (ID) of the selected recommended content, a user ID, a time stamp, and the like) related to the operation is collected, and according to the selection operation of the user, the server performs corresponding logical processing to acquire a new search result, a new recommended content, or the like.

As such, the search result and the recommended content can be dynamically adjusted according to the real-time selection and behavior of the user for the recommended content, and more personalized and relevant content can be provided to the user.

In some embodiments, the image-based search processing method may further include: displaying, in response to receiving the selection operation for the recommended content, text information corresponding to the selection operation in an input box corresponding to the search result page; displaying, in response to receiving an editing operation for the text information, edited text information in the input box; and using the edited text information as a response result to the recommended content, and generating the follow-up questioning request based on the response result.

In some implementations, after seeing the recommended content on the search result page, the user may select the recommended content of interest by clicking or an other interactive manner. After the user selects the recommended content, the client will automatically fill the text information related to the recommended content into the search box for reference or further editing by the user. The user may directly edit the displayed text information in the search box, for example, modify, add or delete part of the text to meet the actual requirements of the user. After the user completes editing, the edited text information may be sent to the system as a response result to the recommended content through a submission button or an other interaction manner. After receiving the response result submitted by the user, the system may perform further processing, such as improving a recommendation algorithm, recording a user preference, performing an operation requested by the user, or the like.

As such, by allowing the user to select and edit the text information of the recommended content and submit the text information as a response result, not only the user operation efficiency is improved, but also the system is facilitated to understand the more specific search intent of the user, thereby providing a more accurate search result or recommended content.

In some embodiments, before outputting the search result and the recommended content, the image-based search processing method may further include: in response to receiving an operation of closing a recommendation function, outputting no recommended content.

In some implementations, an option or setting entrance is provided before the search result page is displayed or while the user is performing a search operation, to allow the user to close the recommendation function. This may be achieved by a switch, a check box or a similar control. When the user chooses to close the recommendation function, this configuration information is stored in the user's session data, the browser data, or the user's personal configuration for identification in a subsequent request. When the user initiates a search request, the system checks the user's setting of the recommendation function. If the configuration for closing the recommendation function is activated, no recommended content is generated or included when processing the search request, and the search result is generated only based on the search request of the user and the search algorithm. If the recommendation function is not closed, the recommended content is additionally generated; or if the recommendation function is closed, only the search result is generated, and the generated search result (without including the recommended content if the user has closed the recommended function) is returned to the user, and displayed on the front-end page.

As such, the user is allowed to close the recommendation function before outputting the search result and the recommended content, and this requirement is satisfied by not outputting the recommended content, and the user is allowed to close the recommendation function, thereby satisfying the personalized requirements of different users. For those users who do not need or do not like the recommend content, their search result pages will be more concise and straightforward, thereby improving search efficiency and satisfaction.

In some embodiments, after outputting the search result and the recommended content, the image-based search processing method may further include: in response to receiving an operation of closing the recommendation function, deleting or hiding the recommended content on the search result page.

In some implementations, a switch or button is designed at a suitable location on the search result page, such as the top, bottom, or sidebar of the page, for controlling the display and hiding of recommended content. When the user clicks on the switch or button, an event handler is triggered. The handler is responsible for receiving an operation instruction from the user and determining whether the user chooses to close the recommendation function. Once it is determined that the user wishes to close the recommendation function, the event handler will send a request to the back-end server or front-end data processing module to remove or hide the recommended content on the search result page. The front-end page updates the layout and content of the search result page in real time according to the received instruction to ensure that the recommended content is no longer displayed to the user.

As such, after outputting the search result and the recommended content, if the system supports the user to close the recommendation function, and accordingly deletes or hides the recommended content on the search result page after receiving the operation of closing the recommendation function by the user, and in this way, the system can dynamically adjust its function and interface design to adapt to the requirements of different user groups, thereby reflecting the flexibility of the system.

Figure 3:
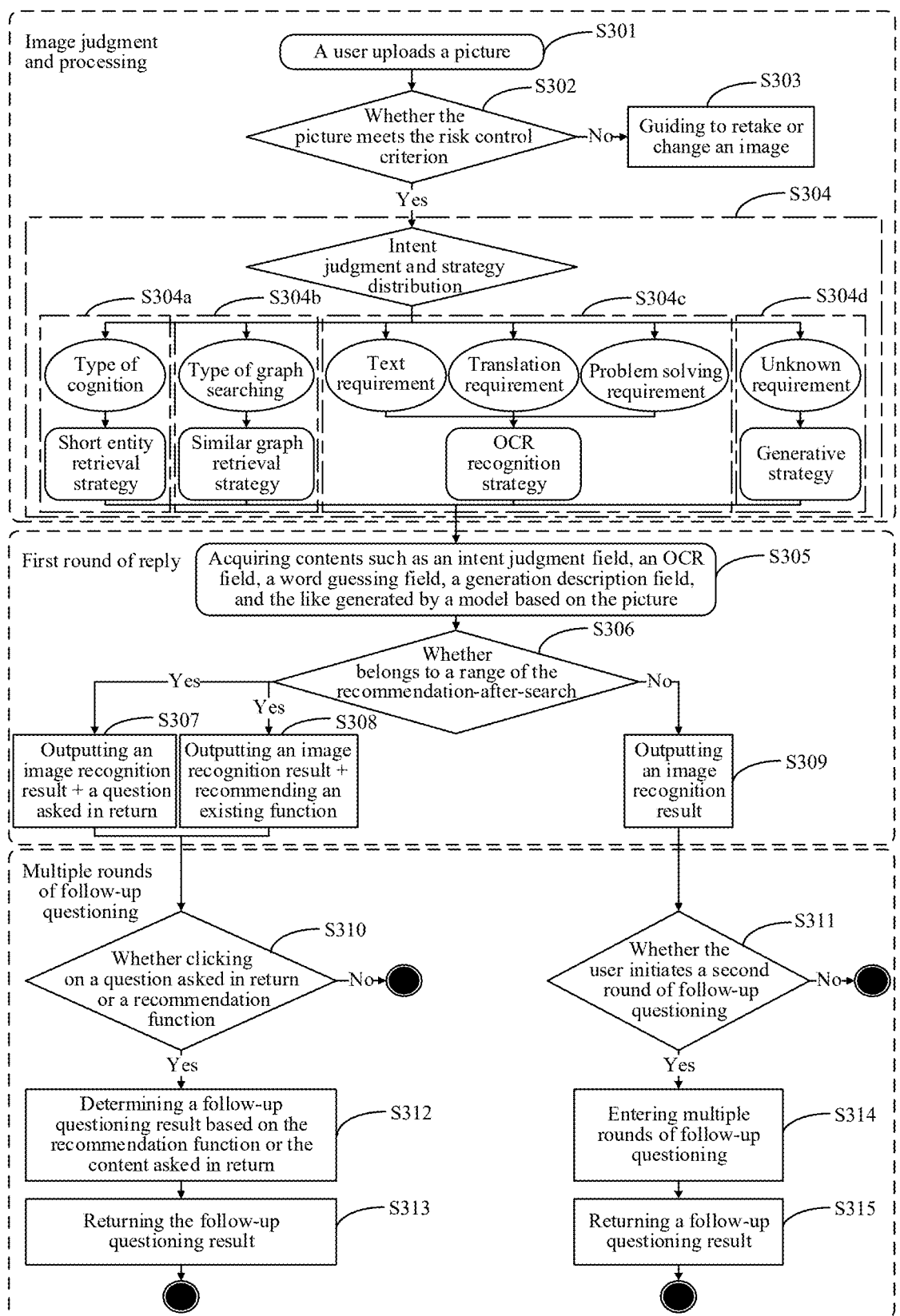
FIG. 3 is a schematic diagram of a flow of an image-based search according to an embodiment of the present disclosure.

A schematic diagram of an image search-based flow is shown in FIG. 3. The flow is divided into three parts: image judgment and processing, first round of reply, and multiple rounds of reply.

S301, a user uploads a picture, and then performs S302;

S302: whether the picture meets the risk control criterion, if yes, executing S303; if no, executing S304;

S303, guiding to retake or change an image;

S304: intent judgment and strategy distribution. Specifically, S304*a*: for a cognitive requirement, a short entity retrieval strategy is adopted, where a short entity generally refers to a short and specific information segment capable of meeting a cognitive requirement of the user;

S304*b*: for a graph searching requirement, a similar graph retrieval strategy is adopted; S304*c*: for a text requirement, a translation requirement, or a problem solving requirement, an OCR recognition strategy is adopted; and S304*d*: for an unknown requirement, a generative strategy is adopted.

S305: acquiring contents such as an intent judgment field, an OCR field, a word guessing field, a generation description field, and the like generated by a model based on the picture, and then executing S306;

S306: judging whether the picture belongs to a range of the recommendation-after-search. If the picture belongs to the range of the recommendation-after-search, and the mode of the recommendation-after-search is asking in return, executing S307; if the picture belongs to the range of the recommendation-after-search, and the mode of the recommendation-after-search is recommending, executing S308; if the picture does not belong to the range of the recommendation-after-search, executing S309;

S307: outputting an image recognition result and a question asked in return, and then executing S310;

S308: outputting an image recognition result and recommending an existing function, and then executing S310;

S309, outputting an image recognition result, and then executing S311;

S310: whether clicking on a question asked in return or a recommendation function, if no, ending the flow; if yes, executing S312;

S311: whether the user initiates a second round of follow-up questioning, if no, ending the flow; if yes, executing S314;

S312: determining a follow-up questioning result based on the recommendation function or the content asked in return, and then executing S313;

S313: returning the follow-up questioning result;

S314: entering multiple rounds of follow-up questioning, and then executing S315;

S315: returning a follow-up questioning result.

The interactive flow based on the image search may include four steps.

Figure 4:
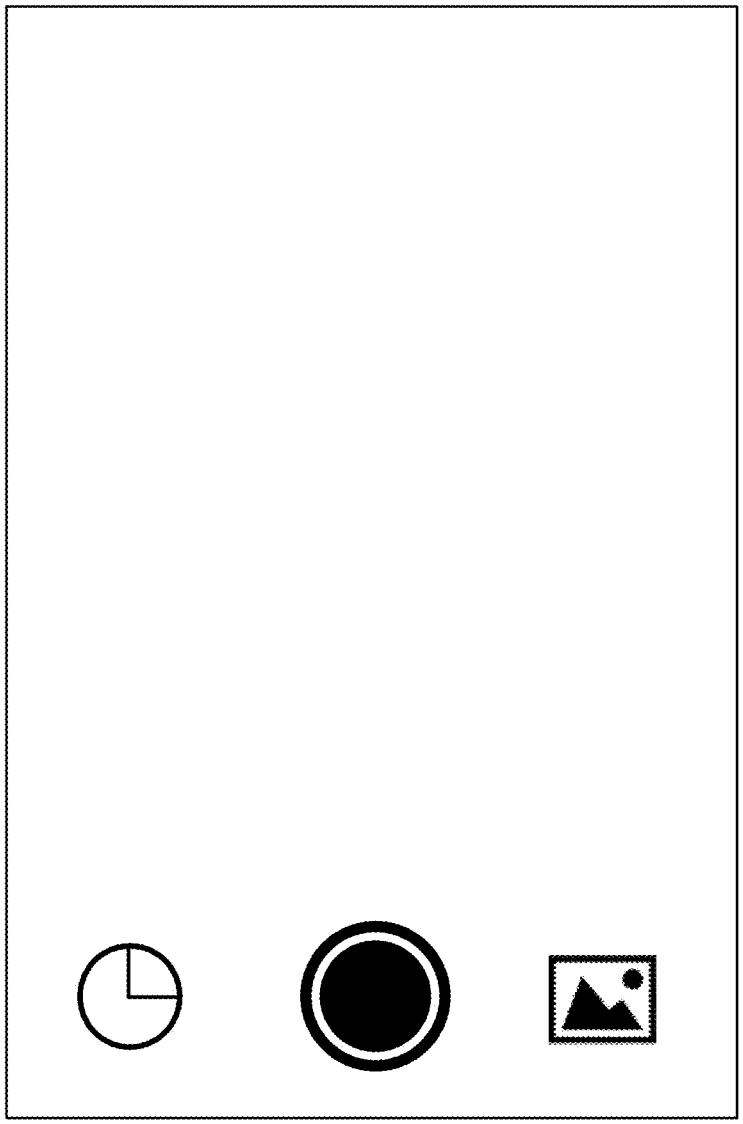
FIG. 4 is a schematic diagram of an interface after triggering a camera entrance of a search application according to an embodiment of the present disclosure.

Step 1: Taking/Selecting a Photo and Sending it:

FIG. 4 illustrates a schematic diagram of an interface after triggering a camera entrance of a search application. As shown in FIG. 4, a historical search button, a photographing button, and a photo album button are sequentially presented at the bottom of the interface from left to right. If the selection of the historical search button or the photo album button by the user is not detected within a preset time, a photo is automatically taken, and then a model is invoked to recognize the image automatically taken. If the user clicks on the photographing button for photographing, a model is invoked to recognize the image taken by the user. If the user selects the photo album button, an image in the photo album is read, and a model is invoked to recognize the image selected by the user. If the user clicks the historical search button, a historical search record is invoked and the user can view the search history.

Step 2: Describing the Image and Presenting a Recommended Content to Complete the Main Requirement Cognition, and Providing an Extension and Guidance Entrance:

the model understands the image information based on the image recognition and the image search capability, helps the user to complete the main requirement of "what is the image", and displays the recommended content through the strategy judgment of the recommendation-after-search.

Step 3: Entering Multiple Rounds of Dialogues According to the Click and Selection Operation of the User on the Recommended Content, to Complete Extended Cognition or Requirement Clarification:

the user clicks on the recommendation function: initiating a search in the selected function with the current image as a query, and obtaining a search result;

the user clicks on a question asked in return: recognizing contents such as an image intent, an OCR field, a word guessing field, and the like based on a model, and for different intents, a recommended question asked in return of different dimensions is provided. After the user clicks on the question asked in return, the user may refine the requirement of the question asked in return in the bottom input box or directly initiate the question asked in return, for example, "Want to know more about the [famous scenic spot]"; and "Want to know more about the [famous scenic spot] indoor".

Figure 5:
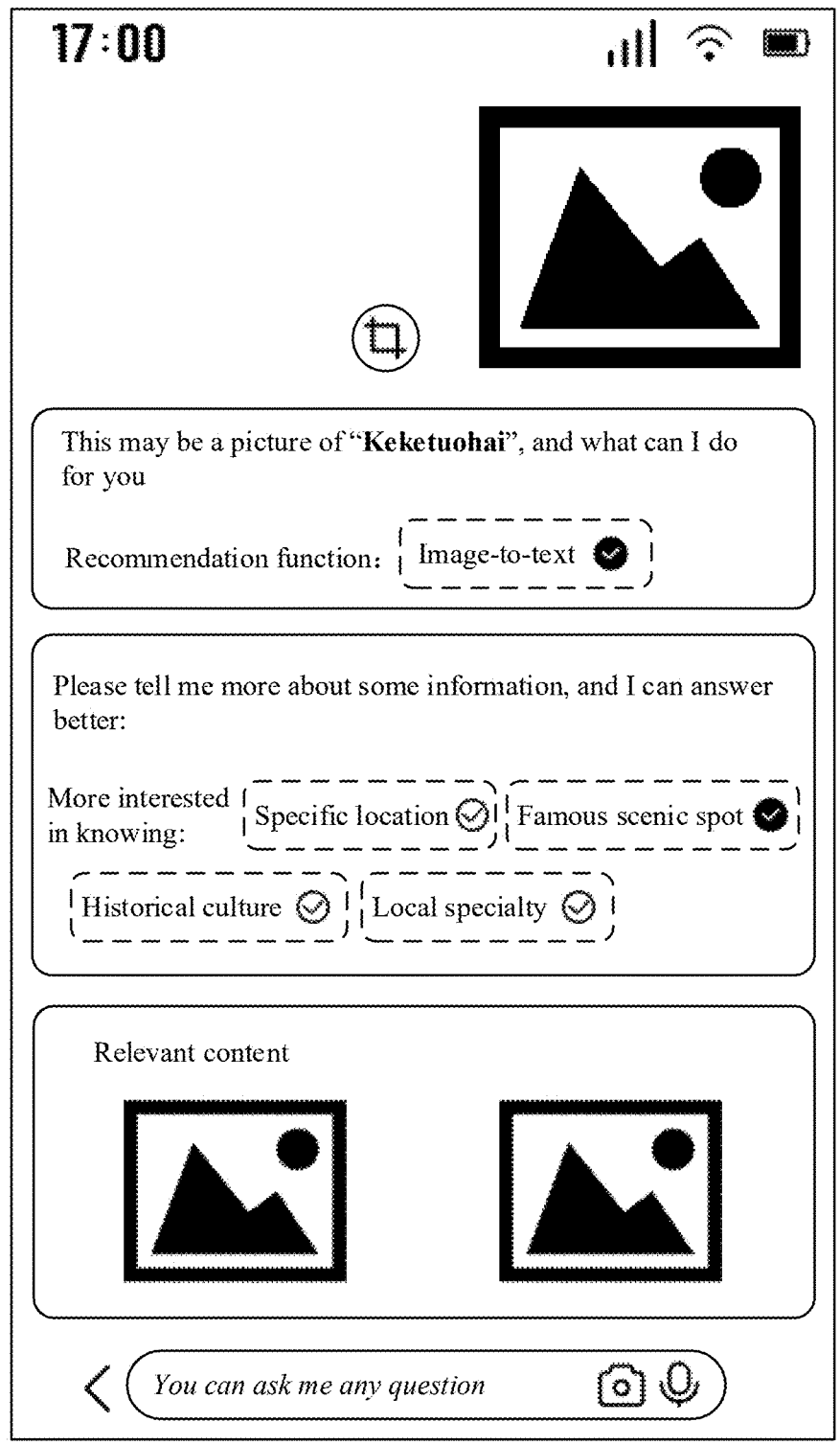
FIG. 5 is a schematic diagram 1 of a search result and a recommended content based on an image search according to an embodiment of the present disclosure.

FIG. 5 illustrates a schematic diagram 1 of a search result and a recommended content based on an image search. As shown in FIG. 5, after a user uploads a picture, the search result presented on the search result page is "This may be a picture of Keketuohai, and what can I do for you". The recommended content presented on the search result page includes the recommendation function "image-to-text", and the recommended content further includes the guidance information including "Please tell me more about some information, and I can answer better: more interested in knowing 'specific location', 'famous scenic spot', and 'local specialty'". At the same time, the search result page further presents a collection of images with a related content.

Figure 6:
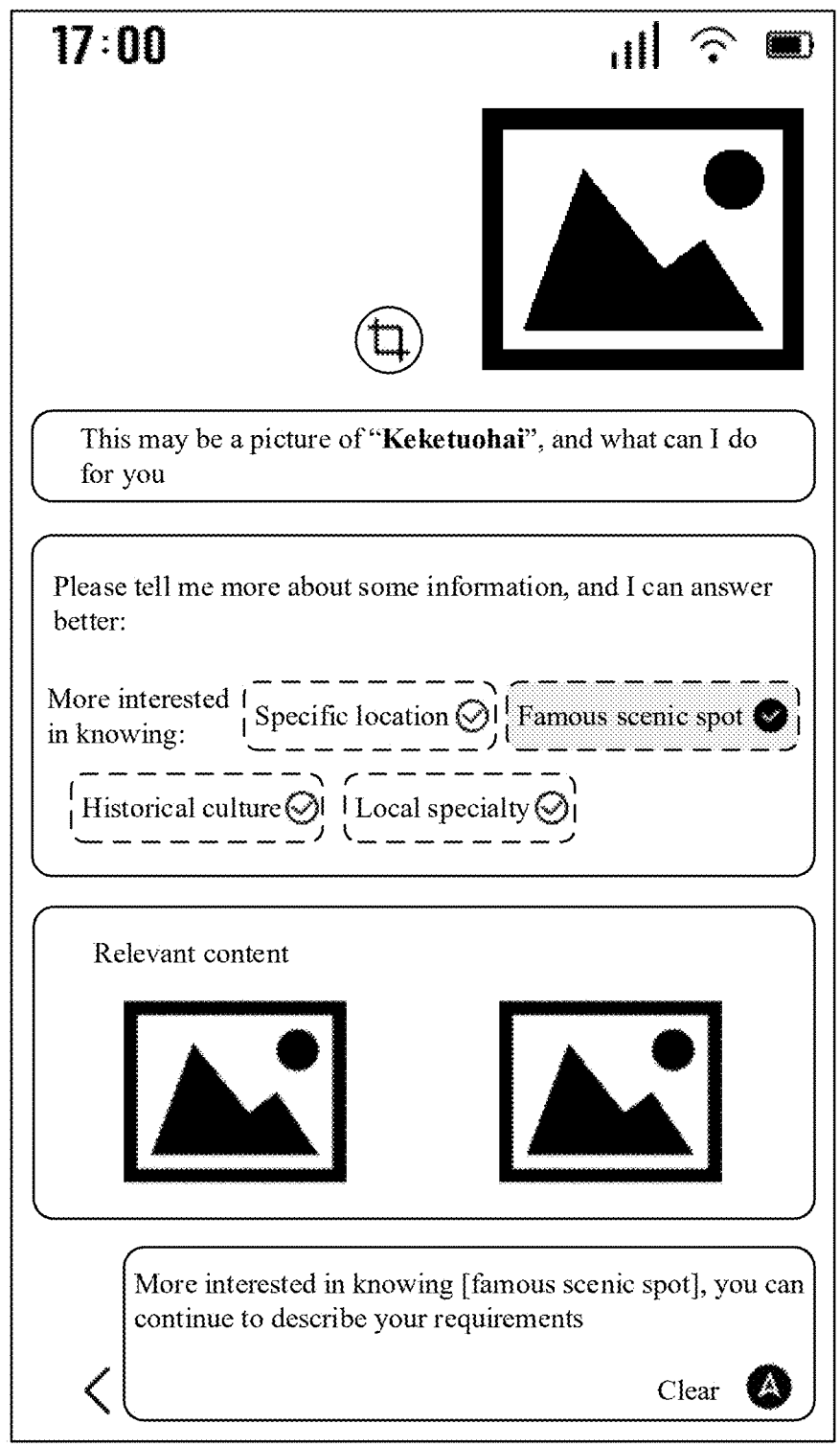
FIG. 6 is a schematic diagram 2 of a search result and a recommended content based on an image search according to an embodiment of the present disclosure.

FIG. 6 illustrates a schematic diagram 2 of a search result and a recommended content based on an image search. As shown in FIG. 6, after a user uploads a picture, the search result presented on the search result page is "This may be a picture of Keketuohai, and what can I do for you". The recommended content presented on the search result page includes guidance information, the guidance information including "Please tell me more about some information, and I can answer better: more interested in knowing 'specific location', 'famous scenic spot', and 'local specialty'". At the same time, the search result page further presents a collection of images with a related content.

Figure 7:
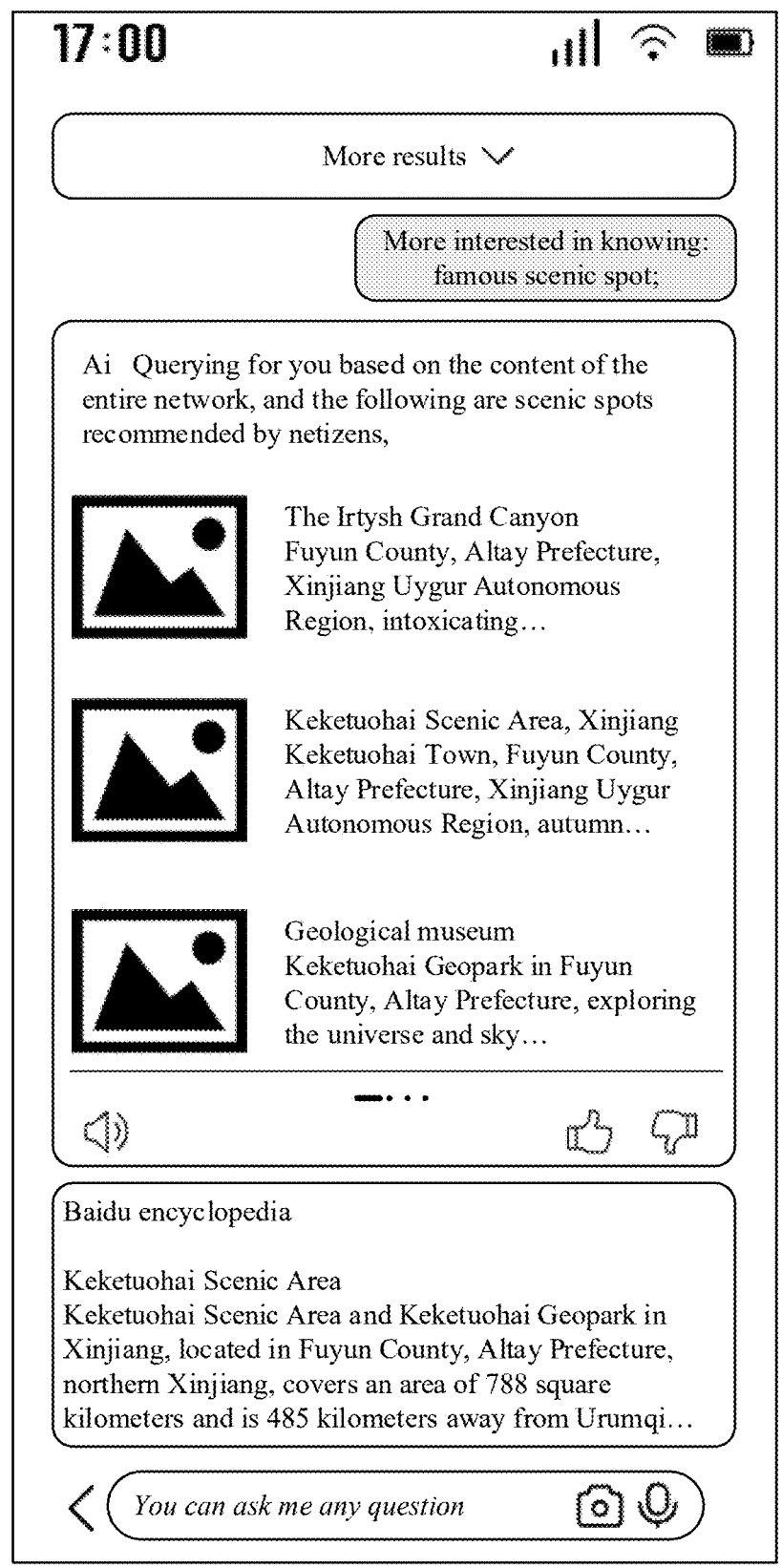
FIG. 7 is a schematic diagram 1 of a search result generated based on a selection operation for the recommended content according to an embodiment of the present disclosure.

As shown in FIG. 6, after the user clicks on the "famous scenic spot", prompt information "More interested in knowing [famous scenic spot], you can continue to describe your requirements" is presented at the bottom of the search results page. The input box is presented with the text information "More interested in knowing: famous scenic spot", and after the user clicks on the sending button, the search result is shown in FIG. 7. In the search result page, the image of the scenic spot recommended for the user and the encyclopedia information of the Keketuohai are presented.

Figure 8:
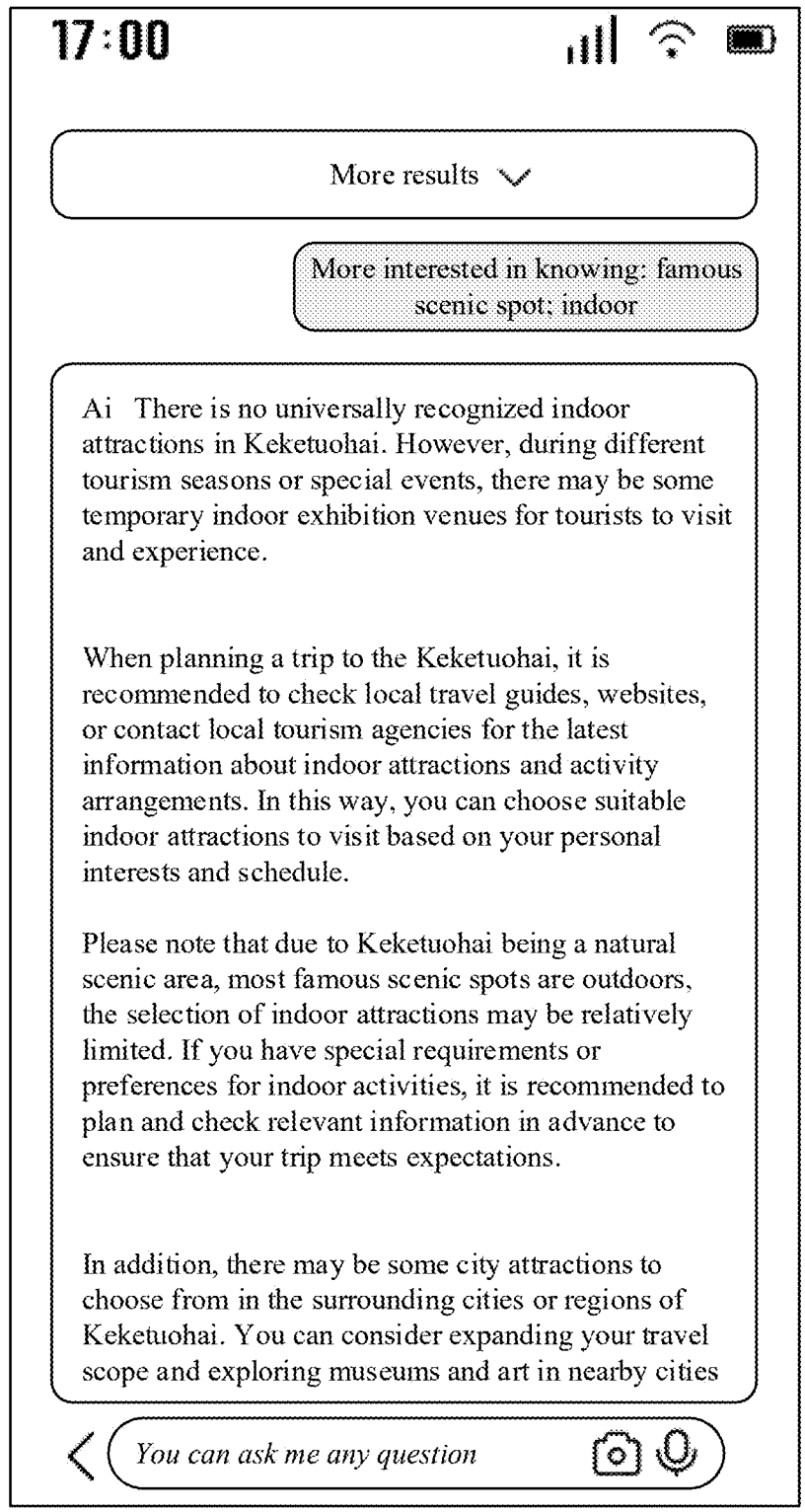
FIG. 8 is a schematic diagram 2 of a search result generated based on a selection operation for the recommended content according to an embodiment of the present disclosure.

As shown in FIG. 6, after the user clicks on the "famous scenic spot", prompt information "More interested in knowing [famous scenic spot], you can continue to describe your requirements" is presented at the bottom of the search results page. The input box is presented with the text information "More interested in knowing: famous scenic spot", the user edits the information in the input box, adds the word "indoor" in the input box. Finally, the result in the input box is "More interested in knowing: famous scenic spot; indoor", then the user clicks on the sending button, and the search result is shown in FIG. 8. In the search result page, a query result on the indoor attraction information of the Keketuohai is presented.

Figure 9:
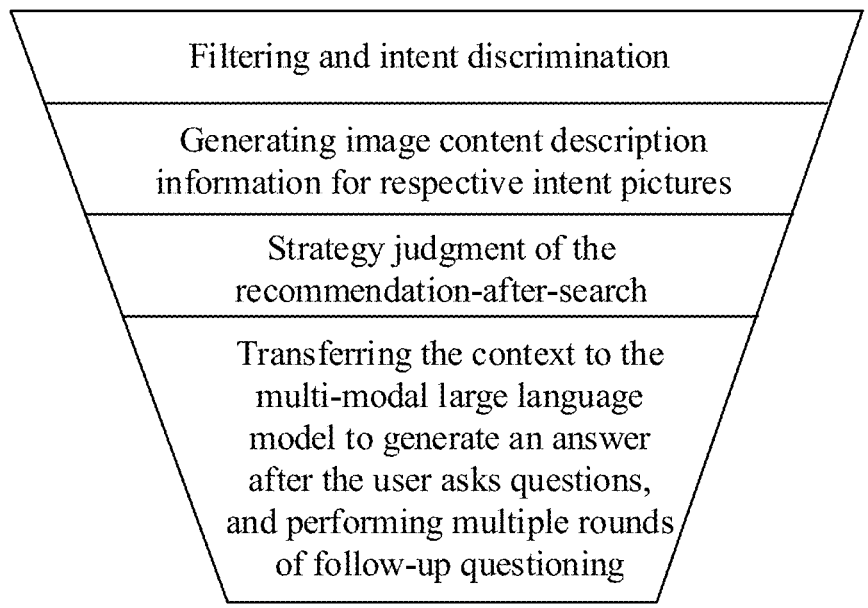
FIG. 9 is a schematic diagram of a framework for implementing a search according to an embodiment of the present disclosure.

A schematic diagram of a framework for implementing a search is shown in FIG. 9, which may be divided into four parts.

The first part is filtering and intent discrimination after the user sends an image.

After the user uploads a picture, in order to accurately identify the strategy and ensure the safety of the risk control, a blurred picture is first filtered; to better produce a picture description, a picture category (type: a two-dimensional code, a bar code, a text, a title, a character, a plant, a material, a face, an animals, an expression, a commodity, or other.) is distinguished by a code detection technology and an intent judgment technology so as to generate image content description information for different types of pictures in the next step.

The second part is to generate image content description information for respective intent pictures.

Image content description information is generated with different paths according to picture types.

For a two-dimensional code or a bar code picture: identifying a link of the two-dimensional code (for example, the link of the two-dimensional code is xxxx) or information of the bar code by a code recognition technology; for a text or a title picture: text information (e.g., text in the picture is xxxx) in the picture is recognized through the OCR technology;

For a character or a plant picture: generating a word guessing result (for example, this is xxx) preferentially through a word guessing model. If no result is generated through the word guessing, a multi-modal large language model is used to generate a picture description result.

For a material, a face, an animal, an expression, a commodity, or an other picture: generating a picture description result (e.g., this is a picture of a tire pressure alarm on a xx automobile dashboard) using a multi-modal large language model for the preponderant scenarios of the model.

In order to ensure the risk control security of the output content, the image content description information needs to be detected whether a sensitive word content exists through the sensitive word filtering model, and after being detected by the sensitive word filtering model, a picture description filed is output, and the first round of description result is presented to the user.

The third part is strategy judgment of the recommendation-after-search.

Based on the contents such as an intent judgment field, an OCR field, a word guessing field, a generation description field, and the like generated by a model based on the picture, it is judged whether the picture belongs to the range of the recommendation-after-search and whether the taking effect manner of the strategy is a question asked in return or a recommendation. If the strategy takes effect, the first round of search recognition result and the recommendation-after-search content are displayed on the search result page.

The fourth part is to transfer the context to the multi-modal large language model to generate an answer after the user asks questions, and to perform multiple rounds of follow-up questioning.

After a user sends a picture and a multi-modal large language model generates a picture description, a multi-round dialogue phase is entered, the dialogue context is sent to the multi-modal large language model, and a return result is generated by the multi-modal large language model, and the user can constantly perform follow-up questioning based on the above content until the requirement is satisfied and the dialogue ends.

As such, the present solution has at least the following effects:

Refined guidance for unclear requirements: after generating image content description information when a user uploads a picture with an unknown requirement through photographing or a photo album, the user is guided to clarify an entity to be queried through a question asked in return for the multi-subject picture, and then after the user performs the click and selection, multiple rounds are entered based on the picture without needing the user to upload a picture again.

New functions are added to actively match application scenarios: an adaptation function is implanted in the recommendation-after-search module, for example, after a commodity cognitive description is provided when a user uploads a commodity picture, an image-to-text function (a copywriting propaganda, a grass-planting article, an online shopping review copywriting, etc.) is implanted in the recommendation-after-search module, and a new function application scenario is actively provided in a product used by the user.

Actively respond to extensible and continuous consumer searches: meeting extended requirements of a user, for example, for a commodity intent, providing a product price comparison function to meet the extended requirements of the user.

Figure 10:
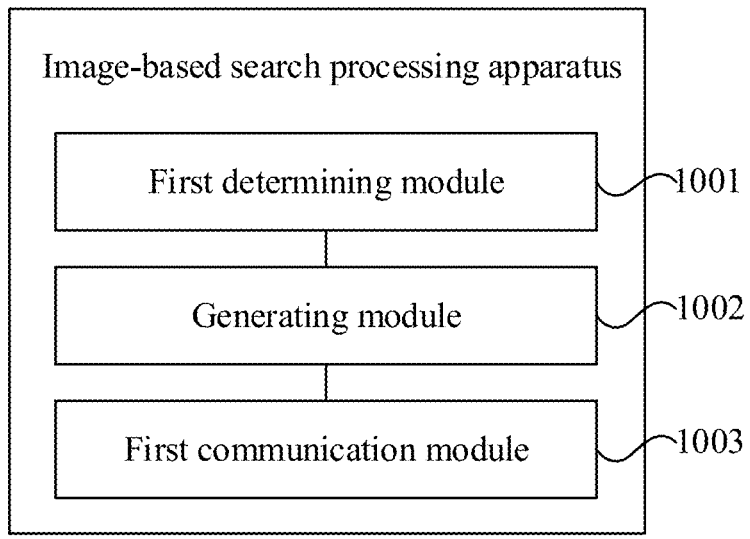
FIG. 10 is a schematic structural diagram 1 of an image-based search processing apparatus according to an embodiment of the present disclosure.

An embodiment of the present disclosure provides an image-based search processing apparatus applied to a server. As shown in FIG. 10, the image-based search processing apparatus may include: a first determining module 1001, configured to determine, in response to receiving an image sent by a terminal, a first requirement corresponding to the image, the first requirement including an original search intent of a user; a generating module 1002, configured to generate a search result and a recommended content corresponding to the image according to the first requirement in a case where the first requirement meets a recommendation triggering condition; and a first communication module 1003 configured to return the search result and the recommended content to the terminal to cause the terminal to output the search result and the recommended content on a search result page.

In some embodiments, the recommended content includes at least one of:
a guidance content, where the guidance content includes a first type of information for guiding the user to clarify a search intent;
a content asked in return, where the content asked in return includes a second type of information for exploring the user to clarify a search intent; or
a function entrance, where the function entrance is used to represent an entrance of an available function recommended for the user.

In some embodiments, the first determining module 1001 is configured to:
analyze respective objects in the image to obtain an intent inference result corresponding to the image, the intent inference result including a target object in the image;
generating image content description information of the image based on a description model adapted to a content type of the image; and
determining the first requirement according to the intent inference result and the image content description information.

In some embodiments, the first determining module 1001 is further configured to: determine the original search intent in combination with the intent inference result and the image content description information; and determine the first requirement according to the original search intent.

In some embodiments, the generating module 1002 includes:
a first generating submodule, configured to generate the search result corresponding to the image according to the first requirement, the search result including a search result obtained based on the original search intent; and a second generating submodule, configured to generate the recommended content corresponding to the image according to the first requirement and the search result.

In some embodiments, the first determining module 1001 is further configured to determine, in response to receiving a follow-up questioning request sent by the terminal, a new first requirement based on the follow-up questioning request, the follow-up questioning request being generated by the terminal based on a selection operation for the recommended content; the generating module 1002 is further configured to generate a new search result and/or a new recommended content corresponding to the image according to the new first requirement; and the first communication module 1003 is further configured to return the new search result and/or the new recommended content to the terminal to cause the terminal to output the new search result and/or the new recommended content on the search result page.

In some embodiments, the image-based search processing apparatus further includes:
a second determination module 1004 (not shown in FIG. 10) configured to determine a second requirement corresponding to the image, the second requirement including a potential search intent of the user.

In some embodiments, the first generating submodule is configured to generate the search result corresponding to the image according to the first requirement, or generate the recommended content corresponding to the image in combination with the first requirement and the second requirement, where the search result at least includes a search result obtained based on the original search intent; and the second generating submodule is configured to generate the recommended content corresponding to the image according to the second requirement, or generate the recommended content corresponding to the image in combination with the first requirement, the search result, and the second requirement, where the recommended content at least includes a search result obtained based on the potential search intent.

In some embodiments, the second determination module 1004 (not shown in FIG. 10) is further configured to:
determine a search stage of the original search intent;
predict the potential search intent based on the search stage of the original search intent; and
determine the second requirement based on the potential search intent.

In some embodiments, the second determination module 1004 (not shown in FIG. 10) is further configured to:
determine a concerned point corresponding to the image based on the first requirement;
obtain a relevant content corresponding to the first requirement based on the concerned point; and
determine the second requirement based on the relevant content.

In some embodiments, the second determining module 1004 (not shown in FIG. 10) is further configured to determine, in response to receiving a follow-up questioning request sent by the terminal, a new second requirement based on the follow-up questioning request, the follow-up questioning request being generated by the terminal based on a selection operation for the recommended content; the generating module 1002 is further configured to generate a new search result and/or a new recommended content corresponding to the image according to the new second requirement; and correspondingly, the first communication module 1003 is further configured to return the new search result and/or the new recommended content to the terminal to cause the terminal to output the new search result and/or the new recommended content on the search result page.

In some embodiments, the second generating submodule is further configured to match a target scenario for the second requirement; and provide a function entrance matching the target scenario, the function entrance being a function entrance adapted to the target scenario.

In some embodiments, the generating module 1002 is further configured to generate the search result corresponding to the image according to the first requirement in a case where the first requirement does not meet the recommendation triggering condition; and the first communication module 1003 is further configured to return the search result to the terminal to cause the terminal to output the search result on the search result page.

In some embodiments, the image-based search processing apparatus may further include:
- a first detection module 1005 (not shown in FIG. 10) configured to, before determining the first requirement of the image, perform a risk control detection on the image, and if the image meets a risk control criterion, enter a process of determining the first requirement of the image; otherwise, return prompt information to the terminal, the prompt information being used to remind that the image is invalid.

In some embodiments, the image-based search processing apparatus further includes:
- a second detection module 1006 (not shown in FIG. 10) configured to, before determining the first requirement of the image, perform a code detection on the image, and if the image meets a code detection criterion, not enter a process of determining the first requirement of the image, obtain a code detection result of the image through a code detection model, and return the code detection result to the terminal.

It should be understood by a person skilled in the art that the functions of respective processing modules in the image-based search processing apparatus applied to the server in the embodiments of the present disclosure may be understood with reference to the foregoing related description of the image-based search processing method applied to the server. Respective processing modules in the image-based search processing apparatus in the embodiments of the present disclosure may be implemented by a generation circuit that implements the functions described in the embodiments of the present disclosure, or may be implemented by a software, that performs the functions described in the embodiments of the present disclosure, running on an electronic device.

According to the image-based search processing apparatus of the embodiment of the present disclosure, search efficiency can be improved, and search intelligence and convenience can be improved.

Figure 11:
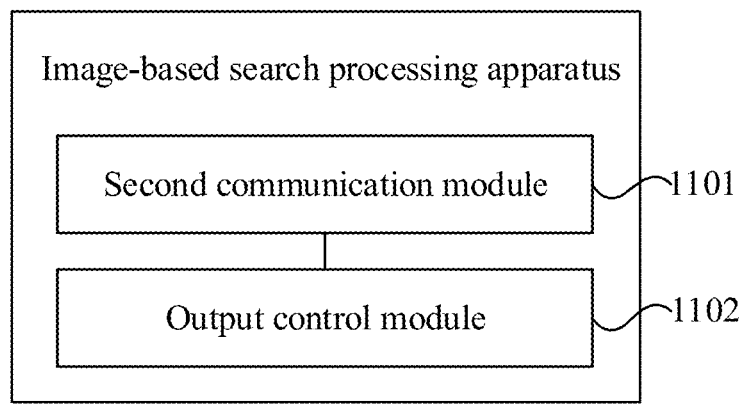
FIG. 11 is a schematic structural diagram 2 of an image-based search processing apparatus according to an embodiment of the present disclosure.

An embodiment of the present disclosure provides an image-based search processing apparatus applied to a terminal. As shown in FIG. 11, a second communication module 1101 is configured to send, in response to receiving an image input by a user through a search application, the image to a server; receive a search result and a recommended content returned by the server; where the search result is determined in a case where the image meets a recommendation triggering condition, and the search result is determined based on a first requirement corresponding to the image, the first requirement including an original search intent of the user; and a output control module 1102 is configured to display the search result and the recommended content on a search result page.

In some embodiments, the recommended content is generated based on the first requirement and the search result.

In some embodiments, the recommended content is generated based on a second requirement, the second requirement including a potential search intent of the user, and the recommended content including a search result obtained based on the potential search intent.

In some embodiments, the recommended content is generated in combination with the first requirement, the search result, and a second requirement, the second requirement including a potential search intent of the user.

In some embodiments, the second communication module 1101 is further configured to send a response result corresponding to the selection operation to the server in response to receiving a selection operation for the recommended content; and receive a new search result or a new recommended content obtained by the server based on the selection operation. The output control module 1102 is configured to display the new search result or the new recommended content on the search result page.

In some embodiments, the second communication module 1101 is further configured to display, in response to receiving the selection operation for the recommended content, text information corresponding to the selection operation in an input box corresponding to the search result page. The output control module 1102 is configured to display, in response to receiving an editing operation for the text information, edited text information in the input box; and use the edited text information as a response result to the recommended content, and generate the follow-up questioning request based on the response result.

In some embodiments, the output control module 1102 is configured to: before outputting the search result and the recommended content, output no recommended content in response to receiving an operation of closing a recommendation function.

In some embodiments, the output control module 1102 is configured to: after outputting the search result and the recommended content, delete the recommended content on the search result page in response to receiving an operation of closing a recommendation function.

It should be understood by a person skilled in the art that the functions of respective processing modules in the image-based search processing apparatus applied to the terminal in the embodiments of the present disclosure may be understood with reference to the foregoing related description of the image-based search processing method applied to the terminal. Respective processing modules in the image-based search processing apparatus in the embodiments of the present disclosure may be implemented by a generation circuit that implements the functions described in the embodiments of the present disclosure, or may be implemented by a software, that performs the functions described in the embodiments of the present disclosure, running on an electronic device.

According to the image-based search processing apparatus according to the embodiments of the present disclosure, when performing an image-based search, an approach of outputting a search result and a recommended content in the first round of reply is adopted. When the search result cannot meet the requirements of the user, the user can quickly clarify the search requirement through the recommended content without needing to re-photograph and upload an image and without needing to spend more time and energy to express the requirements, which may improve the search efficiency, and enhance the intelligence and convenience of the search.

For a description of the specific functions and examples of respective modules and sub-modules of the apparatus of the embodiments of the present disclosure, reference may be made to the related description of the corresponding steps in the above-mentioned method embodiments, and details are not described herein again.

Figure 12:
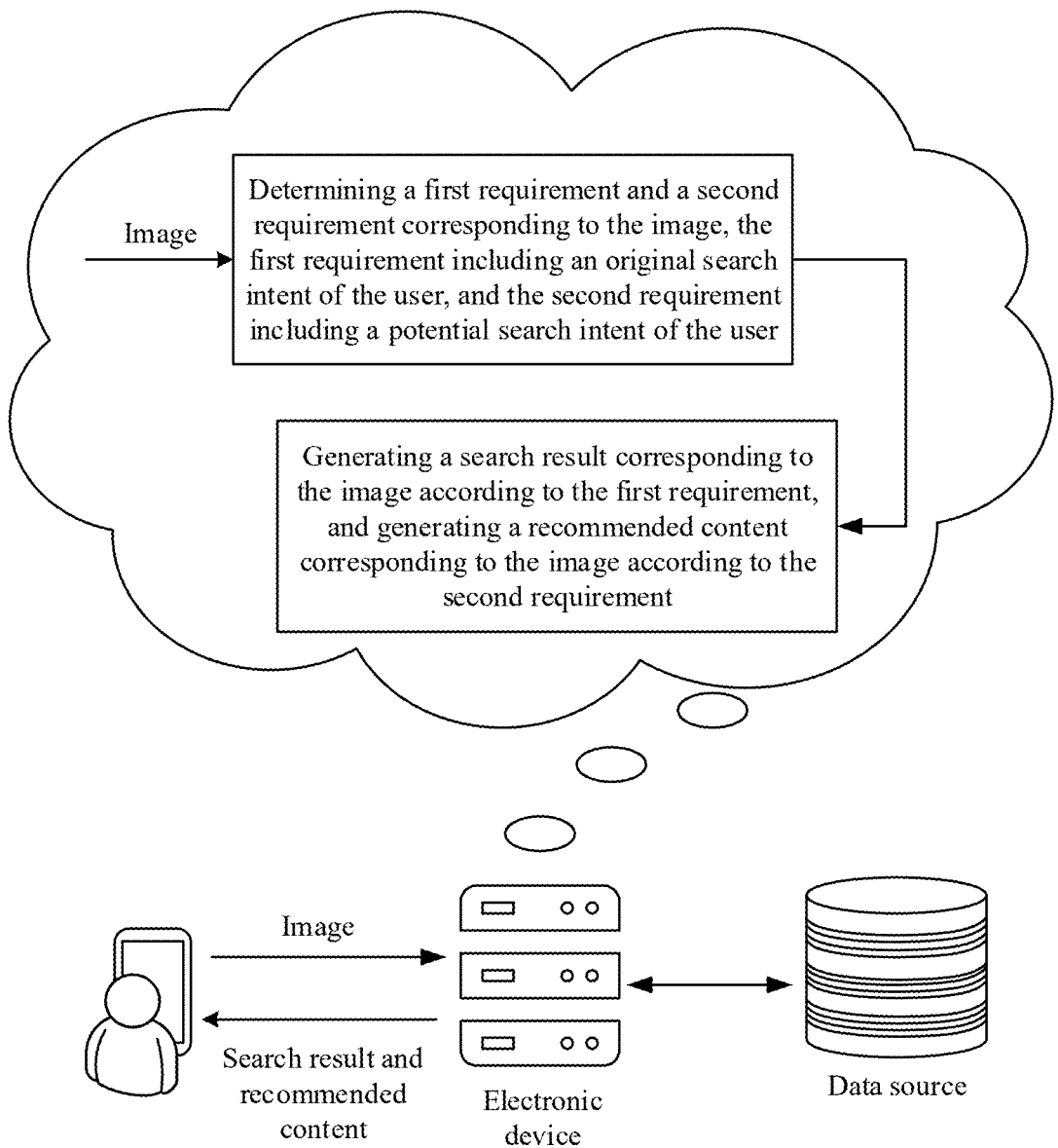
FIG. 12 is a schematic diagram of a scenario of an image-based search processing method according to an embodiment of the present disclosure.

An embodiment of the present disclosure provides a schematic diagram of a scenario of an image-based search processing method, as shown in FIG. 12. As previously described, the image-based search processing method provided in the embodiments of the present disclosure is applied to an electronic device.

Specifically, the electronic device may specifically perform the following operations:

determining, in response to receiving an image sent by a terminal, a first requirement and a second requirement corresponding to the image, the first requirement including an original search intent of the user, and the second requirement including a potential search intent of the user;

generating a search result corresponding to the image according to the first requirement, and generating a recommended content corresponding to the image according to the second requirement; and returning the search result and the recommended content to the terminal to cause the terminal to output the search result and the recommended content on a search result page.

It should be understood that the scenario diagram shown in FIG. 12 is merely illustrative and not restrictive, and that various obvious changes and/or substitutions may be made by a person skilled in the art based on the example of FIG. 12, and the resulting technical solution still falls within the disclosed scope of the embodiments of the present disclosure.

In the technical solution of the present disclosure, the acquisition, storage and application of the user's personal information are all in accordance with the relevant laws and regulations, and do not violate the public order and good customs.

According to an embodiment of the present disclosure, the present disclosure further provides an electronic device, a readable storage medium, and a computer program product.

Figure 13:
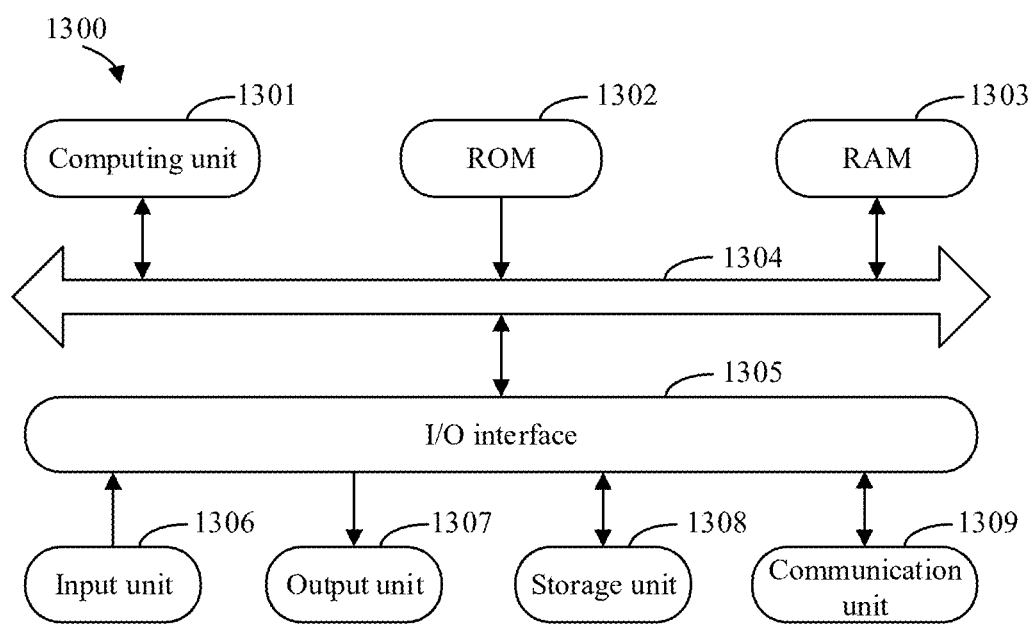
FIG. 13 is a schematic structural diagram of an electronic device for implementing an image-based search processing method according to an embodiment of the present disclosure.

FIG. 13 illustrates a schematic block diagram of an example electronic device 1300 that may be used to implement embodiments of the present disclosure. The electronic device is intended to represent various forms of digital computers, such as a laptop computer, a desktop computer, a worktable, a personal digital assistant, a server, a blade server, a mainframe computer, and other suitable computers. The electronic device may also represent various forms of mobile apparatus, such as a personal digital assistant, a cellular telephone, a smart phone, a wearable device, and other similar computing apparatus. The components shown herein, their connections and relationships, and their functions are by way of example only and are not intended to limit the implementation of the disclosure described and/or claimed herein.

As shown in FIG. 13, the device 1300 includes a computing unit 1301, which may perform various appropriate actions and processes according to a computer program stored in a Read-Only Memory (ROM) 1302 or a computer program loaded from a storage unit 1308 into a Random Access Memory (RAM) 1303. In RAM 1303, various programs and data required for operation of the device 1300 may also be stored. The computing units 1301, ROM 1302, and RAM 1303 are connected to each other via a bus 1304. An Input/Output (I/O) interface 1305 is also connected to bus 1304.

A plurality of components in the device 1300 are connected to the I/O interface 1305, the plurality of components including an input unit 1306, such as a keyboard, a mouse, and the like; an output unit 1307, such as various types of displays, a speaker, and the like; a storage unit 1308, such as a magnetic disk, an optical disk, and the like; and a communication unit 1309, such as a network card, a modem, a wireless communication transceiver, and the like. The communication unit 1309 allows the device 1300 to exchange information/data with other devices over a computer network such as the Internet and/or various telecommunications networks.

The computing unit 1301 may be various general-purpose and/or special-purpose processing components having processing and computing capabilities. Some examples of computing unit 1301 include, but are not limited to, a Central Processing Unit (CPU), a Graphics Processing Unit (GPU), various Artificial Intelligence (AI) computing chips, various computing units running machine learning model algorithms, a Digital Signal Processor (DSP), and any suitable processor, controller, microcontroller, etc. The computing unit 1301 performs various methods and processes described above, such as an image-based search processing method. For example, in some embodiments, the image-based search processing method may be implemented as a computer software program tangibly embodied in a machine-readable medium, such as the storage unit 1308. In some embodiments, some or all of the computer program may be loaded and/or installed on the device 1300 via the ROM 1302 and/or the communication unit 1309. When the computer program is loaded to the RAM 1303 and executed by the computing unit 1301, one or more steps of the image-based search processing method described above may be performed. Alternatively, in other embodiments, the computing unit 1301 may be configured to perform an image-based search processing method by any other suitable means (e.g., by means of firmware).

The various embodiments of the systems and technologies described above herein may be implemented in a digital electronic circuit system, an integrated circuit system, a Field Programmable Gate Array (FPGA), an Application Specific Integrated Circuit (ASIC), an Application-Specific Standard Product (ASSP), a System on Chip (SOC), a Complex Programmable Logic Device (CPLD), a computer hardware, a firmware, a piece of software, and/or a combination thereof. These various embodiments may include: being implemented in one or more computer programs that may execute and/or interpret on a programmable system including at least one programmable processor, which may be a dedicated or general purpose programmable processor, and may receive data and instructions from a memory system, at least one input apparatus, and at least one output apparatus, and transmit the data and instructions to the memory system, the at least one input apparatus, and the at least one output apparatus.

The program code for implementing the method of the present disclosure may be compiled in any combination of one or more programming languages. These program codes may be provided to a processor or controller of a general purpose computer, a special purpose computer, or other programmable data processing apparatus such that the program code, when executed by the processor or controller, causes the functions/operations specified in the flowchart and/or block diagram to be implemented. The program code may be executed entirely on the machine, partly on the machine, partly on the machine as a stand-alone software package and partly on the remote machine or entirely on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media may include an electrical connection based on one or more lines, a portable computer disk, a hard disk, a random access memory, a read-only memory, an Erasable Programmable Read-Only Memory (EPROM), a flash memory, an optical fiber, a Compact Disk Read Only Memory (CD-ROM), an optical storage device, a magnetic storage device, or any suitable combination of the foregoing.

To provide interaction with a user, the systems and technologies described herein may be implemented on a computer having a display device (e.g., a Cathode Ray Tube (CRT) or Liquid Crystal Display (LCD) monitor) for displaying information to the user; and a keyboard and a pointing apparatus (e.g., a mouse or a trackball) through which the user can provide input to a computer. Other types of apparatus may also be used to provide interaction with the user; For example, the feedback provided to the user may be any form of sensory feedback (e.g., visual feedback, auditory feedback, or tactile feedback); and input from the user may be received in any form, including acoustic input, speech input, or tactile input.

The systems and technologies described herein may be implemented in a computing system (e.g., as a data server) including a background component, or a computing system (e.g., an application server) including a middleware component, or a computing system (e.g., a user computer having a graphical user interface or a web browser through which a user may interact with implementations of the systems and technologies described herein) including a front-end component, or a computing system including any combination of such background component, middleware component, or front-end component. The components of the system may be interconnected by any form or medium of digital data communication (e.g., a communication network). Examples of the communication network include a Local Area Network (LAN), a Wide Area Network (WAN), and the Internet.

The computer system may include a client and a server. The client and server are typically remote from each other and typically interact through a communication network. The relationship between the client and the server is generated by a computer program running on the corresponding computer and having a client-server relationship with each other. The server may be a cloud server, a server of a distributed system, or a server incorporating a chain of blocks.

It is to be understood that the steps of reordering, adding or deleting may be performed using the various forms shown above. For example, the steps described in the present disclosure may be performed in parallel or sequentially or in different orders, so long as the desired results of the technical solution disclosed in the present disclosure can be realized, and no limitation is imposed herein.

The foregoing detailed description is not intended to limit the scope of the present disclosure. It will be appreciated by a person skilled in the art that various modifications, combinations, subcombinations, and substitutions may be made depending on design requirements and other factors. Any modifications, equivalents, and modifications that fall within the principles of this disclosure are intended to be included within the scope of protection of this disclosure.

What is claimed is:

1. An image-based search processing method, applied to a server, comprising:
   determining, by the server, in response to receiving an image sent by a terminal, a first requirement corresponding to the image, the first requirement comprising an original search intent of a user, by:
      identifying an object in the image, by using an image classification model, to obtain a type of a content in the image,
      inferring an intent of the identified object, by using a machine learning or deep learning model, to obtain an intent inference result corresponding to the image,
      determining a description model corresponding to the type of the content in the image, the description model comprising at least one of a predefined template, a rule set, or a machine learning model,
      generating image content description information of the image based on the description model,
      determining the original search intent, in combination with the intent inference result and the image content description information, and
      determining the first requirement according to the original search intent, by at least one of:
         in a case where no clear target subject can be directly identified from the image, determining the original search intent as the first requirement of a first type,
         in a case where the first requirement relates to a relationship between at least two subjects pertaining to a same category in the image, determining the original search intent as the first requirement of a second type, or
         in a case where the first requirement relates to background information of the image, determining the original search intent as the first requirement of a third type;
   generating, by the server, a search result corresponding to the image according to the first requirement;
   generating, by the server, a recommended content corresponding to the image according to the first requirement and the search result, in a case where the first requirement meets a recommendation triggering condition, comprising at least one of:
      for the first requirement of the first type, generating a recommended content related to the content of the image but with a broader topic, to help the user to further clarify a search intent,
      for the first requirement of the second type, generating a recommended content related to the relationship between the at least two subjects, or
      for the first requirement of the third type, generating a recommended content related to the background information; and
   returning, by the server, the search result and the recommended content to the terminal to cause the terminal to output the search result and the recommended content on a search result page.

2. The method of claim 1, wherein the recommended content comprises at least one of:

a guidance content, wherein the guidance content comprises a first type of information for guiding the user to clarify a search intent;
a content of asking in return, wherein the content of asking in return comprises a second type of information for exploring the user to clarify a search intent; or
a function entrance, wherein the function entrance is used to represent an entrance of an available function recommended for the user.

3. The method of claim 1, further comprising:
determining, in response to receiving a follow-up questioning request sent by the terminal, a new first requirement based on the follow-up questioning request, the follow-up questioning request being generated by the terminal based on a selection operation for the recommended content;
generating a new search result and/or a new recommended content corresponding to the image according to the new first requirement; and
returning the new search result and/or the new recommended content to the terminal to cause the terminal to output the new search result and/or the new recommended content on the search result page.

4. The method of claim 1, further comprising:
determining a second requirement corresponding to the image, the second requirement comprising a potential search intent of the user;
wherein generating the search result and the recommended content corresponding to the image according to the first requirement comprises:
generating the search result corresponding to the image according to the first requirement, or generating the recommended content corresponding to the image in combination with the first requirement and the second requirement, wherein the search result at least comprises a search result obtained based on the original search intent; and
generating the recommended content corresponding to the image according to the second requirement, or generating the recommended content corresponding to the image in combination with the first requirement, the search result, and the second requirement, wherein the recommended content at least comprises a search result obtained based on the potential search intent.

5. The method of claim 4, wherein determining the second requirement corresponding to the image comprises at least one of:
determining a search stage of the original search intent;
predicting the potential search intent based on the search stage of the original search intent; and
determining the second requirement based on the potential search intent;
or
determining a concerned point corresponding to the image based on the first requirement;
obtaining a relevant content corresponding to the first requirement based on the concerned point; and
determining the second requirement based on the relevant content.

6. The method of claim 4, further comprising:
determining, in response to receiving a follow-up questioning request sent by the terminal, a new second requirement based on the follow-up questioning request, the follow-up questioning request being generated by the terminal based on a selection operation for the recommended content;
generating a new search result and/or a new recommended content corresponding to the image according to the new second requirement; and
returning the new search result and/or the new recommended content to the terminal to cause the terminal to output the new search result and/or the new recommended content on the search result page.

7. The method of claim 4, wherein generating the recommended content corresponding to the image according to the second requirement comprises:
matching a target scenario for the second requirement; and
providing a function entrance matching the target scenario, wherein the recommended content comprises the function entrance.

8. The method of claim 1, further comprising:
generating the search result corresponding to the image according to the first requirement in a case where the first requirement does not meet the recommendation triggering condition; and
returning the search result to the terminal to cause the terminal to output the search result on the search result page.

9. The method of claim 1, wherein before determining the first requirement of the image, the method further comprises at least one of:
performing a risk control detection on the image, and if the image meets a risk control criterion, entering a process of determining the first requirement of the image; otherwise, returning prompt information to the terminal, the prompt information being used to remind that the image is invalid; or
performing a code detection on the image, and if the image meets a code detection criterion, not entering a process of determining the first requirement of the image, obtaining a code detection result of the image through a code detection model, and returning the code detection result to the terminal.

10. An image-based search processing method, applied to the terminal, comprising:
sending, by the terminal, in response to receiving the image input by the user through a search application, the image to the server;
receiving, by the terminal, the search result and the recommended content returned by the server; wherein the search result and the recommended content are obtained by the server by executing the method of claim 1; and
displaying, by the terminal, the search result and the recommended content on the search result page.

11. The method of claim 10, further comprising:
sending a follow-up questioning request to the server in response to receiving a selection operation for the recommended content; and
receiving a new search result and/or a new recommended content obtained by the server based on the follow-up questioning request, and displaying the new search result and/or the new recommended content on the search result page;
wherein the method further comprises:
displaying, in response to receiving the selection operation for the recommended content, text information corresponding to the selection operation in an input box corresponding to the search result page;
displaying, in response to receiving an editing operation for the text information, edited text information in the input box; and using the edited text information as a response result to the recommended content, and generating the follow-up questioning request based on the response result.

12. The method of claim 10, wherein before outputting the search result and the recommended content, the method further comprises:
in response to receiving an operation of closing a recommendation function, outputting no recommended content;
wherein after outputting the search result and the recommended content, the method further comprises:
in response to receiving an operation of closing a recommendation function, deleting or hiding the recommended content on the search result page.

13. An electronic device, comprising:
at least one processor; and
a memory connected in communication with the at least one processor;
wherein the memory stores an instruction executable by the at least one processor, and the instruction, when executed by the at least one processor, enables the at least one processor to execute the method of claim 1.

14. An electronic device, comprising:
at least one processor; and
a memory connected in communication with the at least one processor;
wherein the memory stores an instruction executable by the at least one processor, and the instruction, when executed by the at least one processor, enables the at least one processor to execute the method of claim 10.

15. A non-transitory computer-readable storage medium storing a computer instruction thereon, wherein the computer instruction is used to cause a computer to execute the method of claim 1.

16. A non-transitory computer-readable storage medium storing a computer instruction thereon, wherein the computer instruction is used to cause a computer to execute the method of claim 10.

* * * * *